United States Patent
Peringassery Krishnan et al.

(10) Patent No.: US 11,930,186 B2
(45) Date of Patent: Mar. 12, 2024

(54) METHOD AND APPARATUS FOR VIDEO CODING

(71) Applicant: Tencent America LLC, Palo Alto, CA (US)

(72) Inventors: Madhu Peringassery Krishnan, Mountain View, CA (US); Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/360,431

(22) Filed: Jun. 28, 2021

(65) Prior Publication Data
US 2022/0150510 A1 May 12, 2022

Related U.S. Application Data

(60) Provisional application No. 63/112,529, filed on Nov. 11, 2020.

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/176* (2014.11); *H04N 19/593* (2014.11);
(Continued)

(58) Field of Classification Search
CPC .. H04N 19/159; H04N 19/176; H04N 19/593; H04N 19/61; H04N 19/625; H04N 19/80; H04N 19/91
(Continued)

(56) References Cited

U.S. PATENT DOCUMENTS

2018/0309990 A1 10/2018 Alshina et al.
2019/0387241 A1 12/2019 Kim et al.
(Continued)

FOREIGN PATENT DOCUMENTS

| JP | 2018530245 A | 10/2018 | |
|----|--------------|---------|---|
| JP | 2020053924 | * 4/2020 | ............. H04N 19/12 |

OTHER PUBLICATIONS

JP2020053924 Machine Translation (Year: 2020).*
(Continued)

*Primary Examiner* — Nguyen T Truong
(74) *Attorney, Agent, or Firm* — ARENTFOX SCHIFF LLP

(57) ABSTRACT

Aspects of the disclosure provide a method and an apparatus including processing circuitry for video decoding. The processing circuitry decodes coded information for a transform block (TB) from a coded video bitstream. The coded information indicates one of intra prediction mode information that indicates an intra prediction mode used for the TB, a size of the TB, and a primary transform type used for the TB. The processing circuitry determines a context for entropy decoding a secondary transform index based on the one of the intra prediction mode information for the TB, the size of the TB, and the primary transform type used for the TB. The secondary transform index indicates a secondary transform in a set of secondary transforms that is to be performed on the TB. The processing circuitry entropy decodes the secondary transform index based on the context and performs the secondary transform.

6 Claims, 22 Drawing Sheets

(51) Int. Cl.
| | |
|---|---|
| *H04N 19/593* | (2014.01) |
| *H04N 19/61* | (2014.01) |
| *H04N 19/625* | (2014.01) |
| *H04N 19/80* | (2014.01) |
| *H04N 19/91* | (2014.01) |

(52) U.S. Cl.
CPC .......... *H04N 19/61* (2014.11); *H04N 19/625* (2014.11); *H04N 19/80* (2014.11); *H04N 19/91* (2014.11)

(58) Field of Classification Search
USPC ................................................ 375/240.12
See application file for complete search history.

(56) References Cited

U.S. PATENT DOCUMENTS

| | | | |
|---|---|---|---|
| 2020/0304782 | A1 | 9/2020 | Zhao et al. |
| 2021/0203969 | A1* | 7/2021 | Salehifar ................ H04N 19/61 |

OTHER PUBLICATIONS

Peter de Rivaz et al., AV1 Bitstream & Decoding Process Specification, Jan. 18, 2019. (681 pages).
Benjamin Bross et al., General Video Coding Technology in Responses to the Joint Call for Proposals on Video Compression with Capability beyond HEVC; IEEE Transactions on Circuits and Systems for Video Technology, 2019. (16 pages).
Chun-Chi Chen et al., "Screen Content Coding Using Non-Square Intra Block Copy for HEVC", 2014 (6 pages).
Mei Guo et al., Inter-Layer Adaptive Filtering for Scalable Extension of HEVC, PCS, 2013, 165-168 (4 pages).
Mei GUO et al., Inter-Layer Intra Mode Prediction for Scalable Extension of HEVC, PCS, 2013, pp. 317-320 (4 pages).
PoLin Lai et al., Low Latency Directional Filtering for Inter-Layer Prediction in Scalable Video Coding using HEVC, PCS, 2013, pp. 269-272 (4 pages).
PoLin Lai et al., Combined Temporal and Inter-Layer Prediction for Scalable Video Coding using HEVC, PCS, 2013, pp. 117-120 (4 pages).
Shan Liu et al., Global/Local Motion-Compensated Frame Interpolation for Low Bitrate Video, 2000, 12 pages.
Shan Liu et al., Non-linear Motion-compensated Interpolation for Low Bit Rate Video, 2000, 11 pages.
Shan Liu et al., Nonlinear motion-compensated interpolation for low-bit-rate video, Proceedings of SPIE vol. 4115, Applications of Digital Image Processing XXII, Dec. 28, 2000, 12 pages.
Shan Liu et al., MCI-embedded Motion Compensated Prediction for Quality Enhancement of Frame Interpolation, 2000, 11 pages.
Shan Liu et al., MCI-embedded motion-compensated prediction for quality enhancement of frame interpolation, Proceedings of SPIE Vol. 4209, Multimedia Systems and Applications III, Mar. 22, 2001, 12 pages.
Heung-Yeung Shum et al., Advances in Multimedia Information Processing—PCM 2001, Second IEEE Pacific Rim Conference on Multimedia, Beijing, China, Oct. 24-26, 2001; 10 pages.
Shan Liu et al., Improved Video Coding via Adaptive Selection of Generalized Motion Prediction Modes for B Frames; Picture Coding Symposium, 2001, pp. 358-361 (4 pages).
Shan Liu et al., Complexity Reduction of Joint Temporal-Spatial Bit Allocation Using R-D Models for Video Streaming; IEEE ICIP, 2002, pp. 729-732 (4 pages).
Shan Liu et al., MPEG Video Transcoding with Joint Temporal-Spatial Rate Control, Proceedings of SPIE vol. 4790, Applications of Digital Image Processing XXV, Nov. 21, 2002, 13 pages.
Shan Liu et al., Joint Temporal-Spatial Rate Control with Approximating Rate-Distortion Models, Proceedings of SPIE vol. 4671, 2002, pp. 746-755 (10 pages).
Shan Liu et al., Joint Temporal-Spatial Rate Control for Adaptive Video Transcoding, IEEE ICME 2003, II225-II228 (4 pages).
Shan Liu et al., Hybrid global-local motion compensated frame interpolation for low bit rate video coding, J. Vis. Commun. Image R. 14 (2003), pp. 61-79 (19 pages).
Shan Liu et al., Efficient MPEG-2 to MPEG-4 Video Transcoding, Image and Video Communications and Processing 2003, SPPIE vol. 5022 (2003), pp. 186-195 (10 pages).
Shan Liu et al., Joint Temporal-Spatial Bit Allocation for Video Coding with Dependency, IEEE Transactions on Circuits and Systems for Video Technology, vol. 15, No. 1, Jan. 2005, pp. 15-26 (12 pages).
Shan Liu et al.; Video Prediction Block Structure and the Emerging high Efficiency Video Coding Standard, 2012, 4 pages.
Shan Liu et al., Rectangular Partitioning for Intra Prediction in HEVC, 2012, 6 pages.
Jian Lou et al., Complexity and Memory Efficient GOP Structures Supporting VCR Functionalities in H.264/AVC, IEEE 2008, pp. 636-639 (4 pages).
Jian Lou et al., Trick-Play Optimization for H.264 Video Decoding, TR2010-076, Sep. 2010, 15 pages.
Wei Pu et al., Palette Mode Coding in HEVC Screen Content Coding Extension, IEEE Journal on Emerging and Selected Topics in Circuits and Systems, vol. 6, No. 4, Dec. 2016, 420-432 (13 pages).
Shan Liu et al., Bit-depth Scalable Coding for High Dynamic Range Video, TR2007-078, Apr. 2008, 12 pages.
Yu-Chen Sun et al., Palette Mode—A New Coding Tool In Screen Content Cording Extensions of HEVC, IEEE ICIP 2015, pp. 2409-2413 (5 pages).
Yu-Chen Sun et al., Improved Palette Index Map Coding on HEVC SCC, IEEE ICIP 2016, pp. 4210-4214 (5 pages).
Xiaozhong Xu et al., PU Level Intra Block Copying with Flipping Mode, APSIPA 2014, 7 pages.
Xiaozhong Xu et al., Block Vector Prediction in Intra Block Copy for HEVC Screen Content Coding, 2015 Data Compressior Conference, IEEE, 2015, pp. 273-282 (10 pages).
Xiaozhong Xu et al., Intra Block Copy in HEVC Screen Content Coding Extensions, IEEE Journal on Emerging and Selectei Topics in Circuits and Systems, 2016, 11 pages.
Ximin Zhang et al., Intra Mode Coding in HEVC Standard, 2012, 6 pages.
Yao-Jen Chang et al., Intra prediction using multiple reference lines for the versatile video coding standard, 2019, 8 pages.
Zhaobin Zhang et al., Fast Adaptive Multiple Transform for Versatile Video Coding, 2019 Data Compression Conference (DCC), IEEE 2019, pp. 63-72 (10 pages).
Zhaobin Zhang et al., Fast DST-7/DCT-8 with Dual Implementation Support for Versatile Video Coding, IEEE Transactions on Circuits and Systems for Video Technology, 2020, 17 pages.
Xin Zhao et al., Novel Statistical Modeling, Analysis and Implementation of Rate-Distortion Estimation for H.264/AVC Coders, IEEE Transactions on Circuits and Systems for Video Technology, vol. 20, No. 5, May 2010, pp. 647-660 (14 pages).
Xin Zhao et al., NSST: Non-Separable Secondary Transforms for Next Generation Video Coding, IEEE, 2016, 5 pages.
Xin Zhao et al., Low-Complexity Intra Prediction Refinements for Video Coding, IEEE, PCS 2018, pp. 139-143 (5 pages).
Xin Zhao et al., Joint Separable and Non-Separable Transforms for Next-Generation Video Coding, IEEE Transactions on Image Processing, 2018, 13 pages.
Xin Zhao et al., Coupled Primary and Secondary Transform for Next Generation Video Coding, IEEE, 2018, 4 pages.
Liang Zhao et al., Wide Angular Intra Prediction for Versatile Video Coding, Data Compression Conference (DCC), IEEE, 2019, pp. 53-62 (10 pages).
Benjamin Bross et al., Versatile Video Coding (Draft 2), Document: JVET-K1001-v6, Joint Video Experts Team (JVET) of ITU-T SG 16 WP 3 and ISO/IEC JTC1/SC 29/WG11, 11th Meeting: Ljubljana, SI, Jul. 10-18, 2018, 140 pages.
Benjamin Bross et al., Versatile Video Coding (Draft 6), Document: JVET-O2001-vE, Joint Video Experts Team (JVET) of ITU-T SG 16 WP 3 and ISO/IEC JTC1/SC 29/WG11, 15th Meeting: Gothenburg, SE, Jul. 3-12, 2019, 456 pages.

(56) References Cited

OTHER PUBLICATIONS

L. Zhao et al., CE3-related: Unified MPM list based on CE3-3.3 and CE3-3.5.1 (JVET-N0394), Mar. 2019, 12 pages.
Liang Zhao et al., CE3-related: Unified MPM list based on CE3-3.3 and CE3-3.5.1, Document JVET-N0394-r2, Mar. 2019, 11 pages.
Appendix A, JVET-N0394-test1 (3 pages).
Appendix B, JVET-N0394-test2 (3 pages).
Appendix C, JVET-N0394-test3 (3 pages).
Appendix D, JVET-N0394-test4 (3 pages).
Appendix E, JVET-N0394-test5 (3 pages).
Appendix F, JVET-N0394-test6 (3 pages).
Appendix G, JVET-N0394-test7 (3 pages).
Fabien Racapé et al., CE3-related: Wide-angle intra prediction for non-square blocks, JVET-K0500, 10 pages.
Fabien Racapé et al., CE3-related: Wide-angle intra prediction for non-square blocks, JVET-K0500_r1, 7 pages.
Fabien Racapé et al., CES-related: Wide-angle intra prediction for non-square blocks, JVET-K0500_r2, 7 pages.
Fabien Racapé et al., CES-related: Wide-angle intra prediction for non-square blocks, JVET-K0500_r3, 12 pages.
Fabien Racapé et al., CES-related: Wide-angle intra prediction for non-square blocks, JVET-K0500_r4, 13 pages.
Appendix H, JVET-K0500-BMS (2 pages).
Appendix I, JVET-K0500-VTM (2 pages).
Appendix J, JVET-K0500-VTM-NoBF (2 pages).
Appendix K, JVET-L0283_CE3-1.1.1-VTM (3 pages).
Appendix L, JVET-L0283_CE3-1.1.2-VTM (3 pages).
Appendix M, JVET-L0283_CE3-1.1.3_C1-VTM (3 pages).
Appendix N, JVET-L0283_CE3-1.1.3_C2-VTM (3 pages).
Appendix O, JVET-L0283_CE3-1.1.3_CS-VTM (3 pages).
Appendix P, JVET-L0283_CE3-1.1.3-VTM (3 pages).
Appendix Q, JVET-L0283_CE3-1.1.4-VTM (3 pages).
Benjamin Bross et al., CE3: Multiple reference line intra prediction (Test 1.1.1, 1.1.2, 1.1.3 and 1.1.4), DocumentJVET-L0283-v2, 7 pages.
Benjamin Bross et al., Versatile Video Coding (Draft 2), Document: JVET-K1001-v6, 141 pages.
Xin Zhao et al., CE6: On 8-bit primary transform core (Test 6.1.3), Document: JVET-L0285, 17 pages.
Appendix R, JVET-L0285_CE6-1.3a (2 pages).
Appendix S, JVET-L0285_CE6-1.3b (2 pages).
Appendix T, JVET-L0285_CE6-1.3b_LowQP (2 pages).
Appendix U, JVET-L0285_CE6-1.3a_LowQP (2 pages).
Xin Zhao et al., CE6: On 8-bit primary transform core (Test 6.1.3), Document: JVET-L0285-r1, 17 pages.
Xin Zhao et al., CE6: Fast DST-7/DCT-8 with dual implementation support (Test 6.2.3), Document: JVET-M0497, 11 pages.
Appendix V, JVET-M0497-CE6-2-3a (2 pages).
Appendix W, JVET-M0497-CE6-2-3a_LowQP (2 pages).
Xin Zhao et al., CE6-related: Unified LFNST using block size independent kernel, Document: JVET-O0539-v2, 13 pages.
Appendix X, JVET-O0539-vs-CE6-2.1a (2 pages).
Appendix Y, JVET-00539-vs-CE6-2.1a-LowQP (2 pages)
Appendix Z, JVET-O0539-vs-CE6-2.1b (2 pages).
Appendix AA, JVET-O0539-vs-CE6-2.1b-LowQP (2 pages).
Appendix AB, JVET-00539-vs-VTM5_r1 (2 pages).
Appendix AC, JVET-O0539-vs-VTM5-LowQP_r1 (2 pages).
Appendix AD, JVET-O0545_Log2MaxTbSize=4 (3 pages).
Appendix AE, JVET-O0545_Log2MaxTbSize=5 (2 pages).
Appendix AF, JVET-00545_Log2MaxTbSize=6 (2 pages).
Xin Zhao et al., Non-CE6: Configurable max transform size in VVC, Document: JVET-O0545-v2, 6 pages.
International Search Report and Written Opinion dated Oct. 6, 2021 in PCT/US 21/39633, 16 pages.
Supplementary European Search Report dated Feb. 2, 2023 in Application No. 21892500.6, pp. 1-14.
JCT-VC: "Test Model under Consideration (TMuC)", 1. JCT-VC Meeting; Apr. 15, 2010-Apr. 23, 2010; Dresden; (Joint Collaborative Team on Video Coding of ISO/IEC JTC1/SC29/WG11 and ITU-T SG.16 ), No. JCTVC-A205 Jul. 18, 2010, pp. 1-119.
Zhao Xin et al: "Unified Secondary Transform for Intra Coding Beyond Av1", 2020 IEEE International Conference on Image Processing (ICIP), IEEE, Oct. 25, 2020, pp. 3393-3397.
Nalci A et al: "Non-CE6: An Improved Context Modeling for LFNST", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. IVET-O0373 ; m48492, Jul. 9, 2019, pp. 1-3.
Pavez Eduardo et al: "Learning separable transforms by inverse covariance estimation" , 2017 IEEE International Conference on Image Processing (ICIP), IEEE, Sep. 17, 2017, pp. 285-289.
Jingning Han et al: "A Technical Overview 10-13 of AV1", arxiv. org, Cornell University Library, 201 Olin Library Cornell University Ithaca, NY 14853, Aug. 13, 2020, pp. 1-20.
Japanese Office Action dated Jul. 24, 2023 in Application No. 2022-549019, pp. 1-12.

* cited by examiner

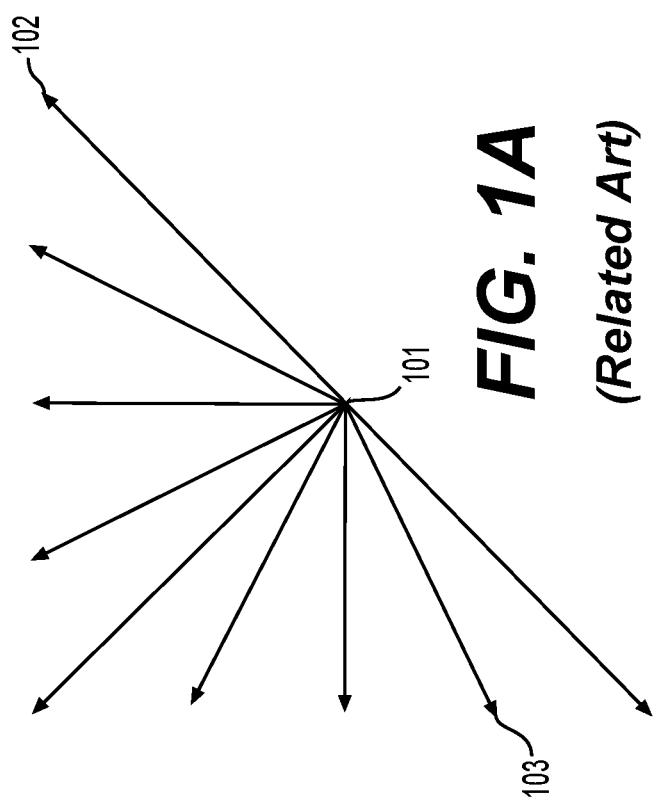
FIG. 1A *(Related Art)*

| Transform Type | Basis function $T_i(j)$, $i,j=0, 1,..., N-1$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$<br>where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

*FIG. 15*

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓; DCT → | ✓ (block size ≤ 16×16) | ✓ (block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓ (block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16×16) | ✓ (block size ≤ 32×32) |
| V_DCT | DCT ↓; IDTX → | ✓ (block size < 16×16) | ✓ (block size ≤ 16×16) |
| H_DCT | IDTX ↓; DCT → | | |
| V_ADST | ADST ↓; IDTX → | ✗ | ✓ (block size < 16×16) |
| H_ADST | IDTX ↓; ADST → | | |
| V_FLIPADST | FLIPADST ↓; IDTX → | ✗ | ✓ (block size < 16×16) |
| H_FLIPADST | IDTX ↓; FLIPADST → | | |

1610 brackets rows ADST_DCT through FLIPADST_ADST.
1620 brackets rows V_ADST through H_FLIPADST.

FIG. 16A

| Intra prediction | Vertical Transform | Horizontal Transform |
|:---:|:---:|:---:|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 16B

$$L_c = \begin{bmatrix} w_c + v_{c1} & -w_c & & & 0 \\ -w_c & 2w_c & -w_c & & \\ & -w_c & \ddots & \ddots & \\ & & \ddots & 2w_c & -w_c \\ 0 & & & -w_c & w_c + v_{c2} \end{bmatrix} \text{ for } w_c > 0$$

METHOD AND APPARATUS FOR VIDEO CODING

INCORPORATION BY REFERENCE

This present disclosure claims the benefit of priority to U.S. Provisional Application No. 63/112,529, "CONTEXT DESIGN FOR ENTROPY CODING OF SECONDARY TRANSFORM INDEX" filed on Nov. 11, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode coded information for a transform block (TB) from a coded video bitstream. The coded information can indicate one of intra prediction mode information for the TB, a size of the TB, and a primary transform type used for the TB. The intra prediction mode information for the TB can indicate an intra prediction mode used for the TB. The processing circuitry can determine a context for entropy decoding a secondary transform index based on the one of the intra prediction mode information for the TB, the size of the TB, and the primary transform type used for the TB. The secondary transform index can indicate a secondary transform in a set of secondary transforms that is to be performed on the TB. The processing circuitry can entropy decode the secondary transform index based on the context and perform the secondary transform indicated by the secondary transform index on the TB.

In an embodiment, the one of the intra prediction mode information for the TB, the size of the TB, and the primary transform type used for the TB can indicate the size of the TB. The processing circuitry can determine the context for entropy decoding the secondary transform index based on the size of the TB. In an example, the size of the TB indicates a width W of the TB and a height H of the TB, a minimum of the width W of the TB and the height H of the TB is L, and the processing circuitry can determine the context based on L or L×L.

In an embodiment, the one of the intra prediction mode information for the TB, the size of the TB, and the primary transform type used for the TB can indicate the intra prediction mode information for the TB. The processing circuitry can determine the context for entropy decoding the secondary transform index based on the intra prediction mode information for the TB.

In an example, the intra prediction mode information for the TB indicates a nominal mode index, the TB being predicted using a directional prediction mode that is determined based on the nominal mode index and an angular offset, and the processing circuitry can determine the context for entropy decoding the secondary transform index based on the nominal mode index.

In an example, the intra prediction mode information for the TB indicates a nominal mode index. The TB can be predicted using a directional prediction mode that is determined based on the nominal mode index and an angular offset. The processing circuitry can determine the context for entropy decoding the secondary transform index based on an index value associated with the nominal mode index.

In an example, the intra prediction mode information for the TB indicates a non-directional prediction mode index. The TB can be predicted using a non-directional prediction mode indicated by the non-directional prediction mode index. The processing circuitry can determine the context for entropy decoding the secondary transform index based on the non-directional prediction mode index.

In an example, the intra prediction mode information for the TB indicates a recursive filtering mode used to predict the TB. The processing circuitry can determine a nominal mode index based on the recursive filtering mode. The nominal mode index can indicate a nominal mode. The processing circuitry can determine the context for entropy decoding the secondary transform index based on the nominal mode index.

In an embodiment, the one of the intra prediction mode information for the TB, the size of the TB, and the primary transform type used for the TB can indicate the primary transform type used for the TB. The processing circuitry can determine the context for entropy decoding the secondary transform index based on the primary transform type used for the TB.

A primary transform indicated by the primary transform type can include a horizontal transform indicated by a horizontal primary transform type and a vertical transform indicated by a vertical primary transform type. In an example, the processing circuitry determines the context for entropy decoding the secondary transform index based on whether the horizontal primary transform type and the vertical primary transform type are both discrete cosine transforms (DCTs) or both asymmetric discrete sine transforms (ADSTs).

In an example, the processing circuitry determines the context for entropy decoding the secondary transform index based on whether the horizontal primary transform type and the vertical primary transform type are both discrete cosine transforms (DCTs) or both line graph transforms (LGTs).

In an example, the processing circuitry determines the context for entropy decoding the secondary transform index based on whether the horizontal primary transform type and the vertical primary transform type are (i) both discrete cosine transforms (DCTs), (ii) both line graph transforms (LGTs), (iii) a DCT and an LGT, respectively, or (iv) an LGT and a DCT, respectively.

In an example, the processing circuitry determines the context for entropy decoding the secondary transform index based on whether the horizontal primary transform type and the vertical primary transform type are (i) both discrete cosine transforms (DCTs), (ii) both line graph transforms (LGTs), (iii) a DCT and an identity transform (IDTX), respectively, or (iv) an IDTX and a DCT, respectively.

Aspects of the disclosure also provide non-transitory computer-readable mediums storing instructions which when executed by a computer for video decoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIG. 15 shows examples of primary transform basis functions according to embodiments of the disclosure.

FIG. 16A shows exemplary dependencies of availability of various transform kernels based on a transform block size and a prediction mode according to embodiments of the disclosure.

FIG. 16B shows exemplary transform type selections based on an intra prediction mode according to embodiments of the disclosure.

DETAILED DESCRIPTION OF EMBODIMENTS

Figure 1B:
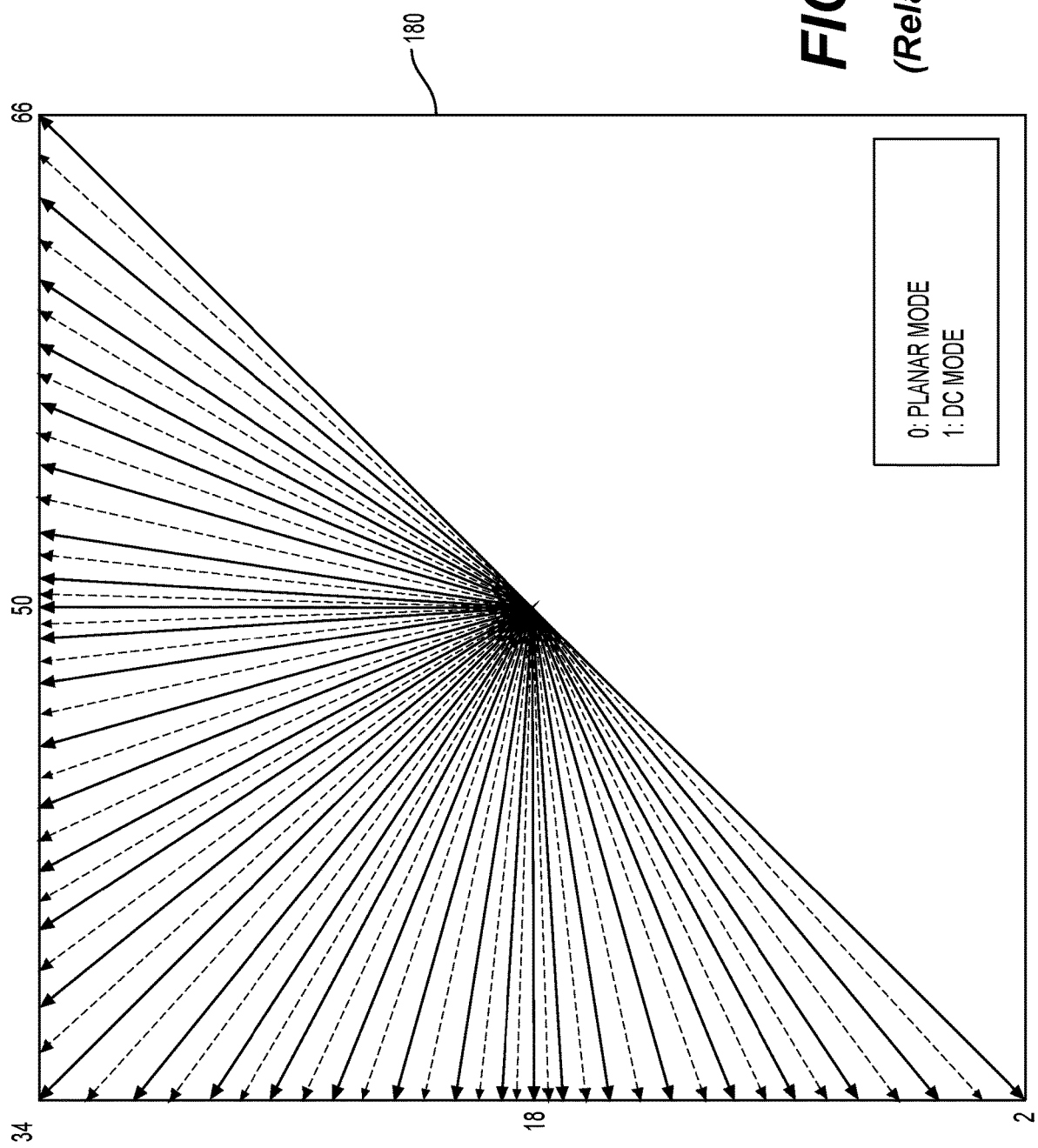
FIG. 1B is an illustration of exemplary intra prediction directions.
Figure 2:
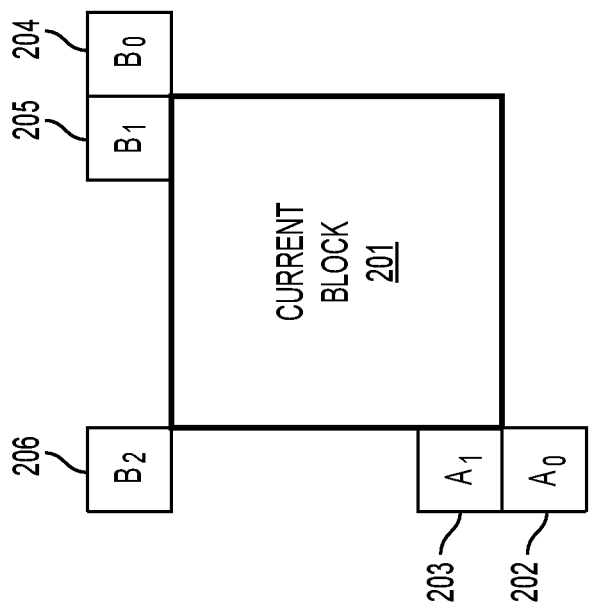
FIG. 2 is a schematic illustration of a current block and its surrounding spatial merge candidates in one example.
Figure 3:
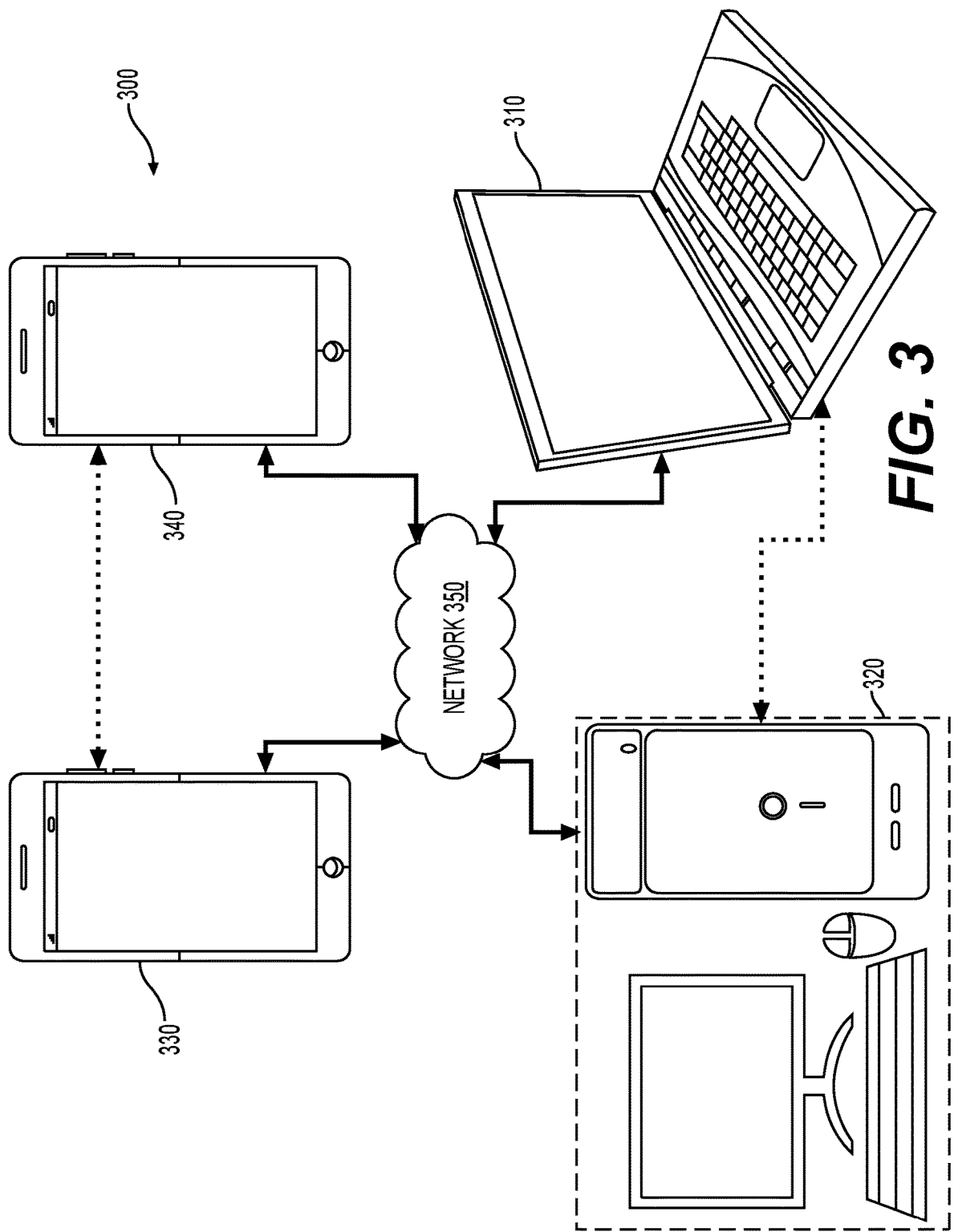
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
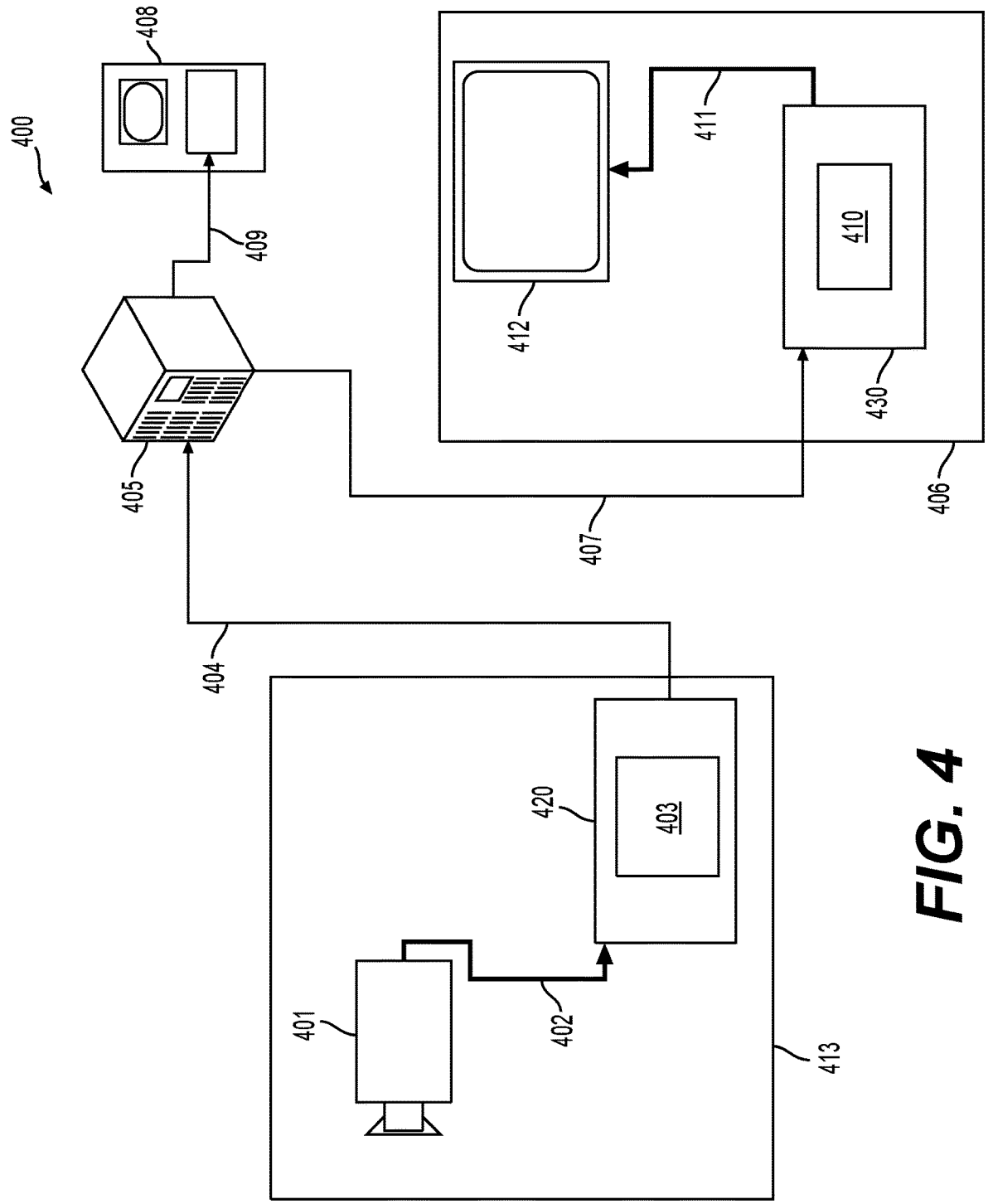
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
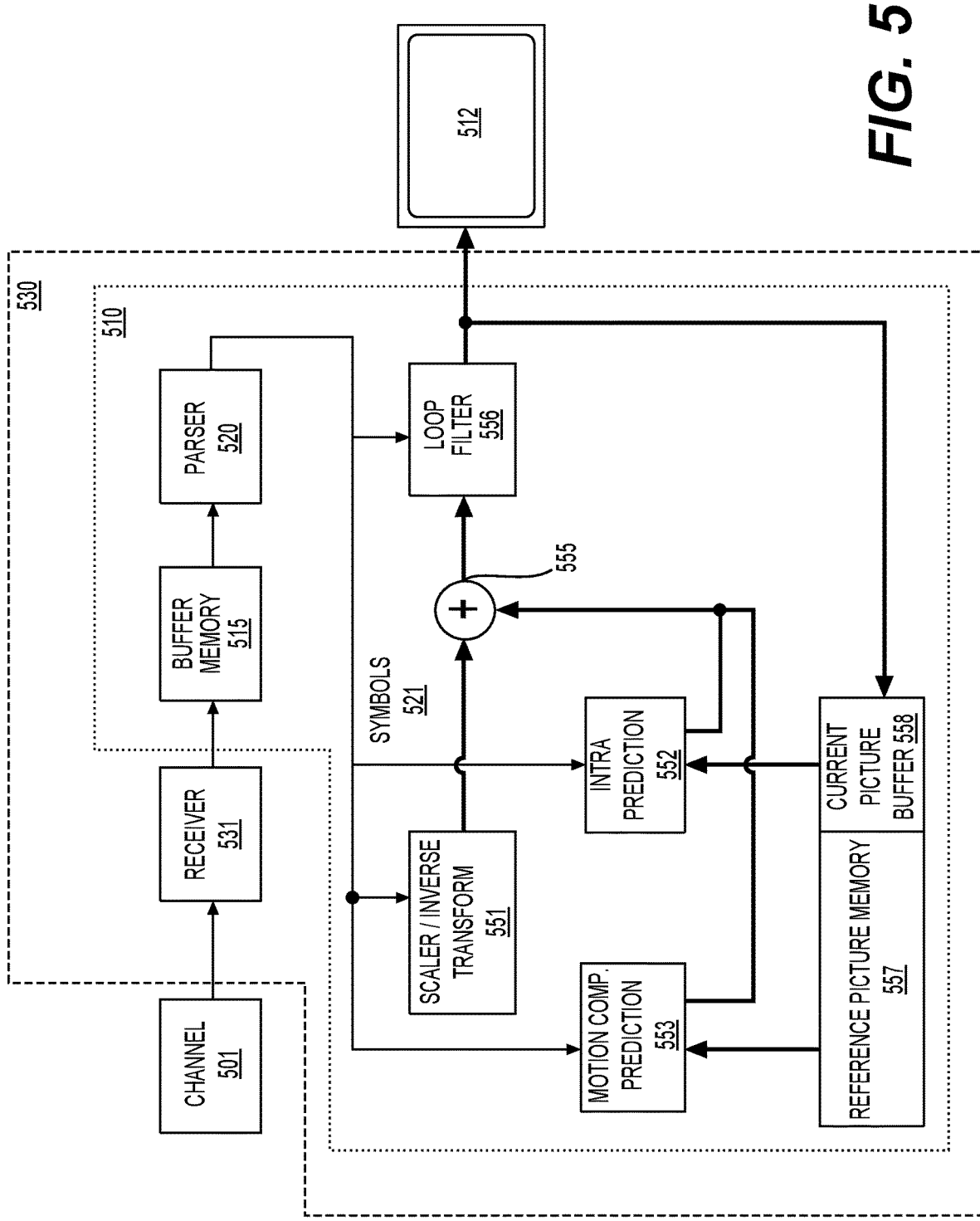
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
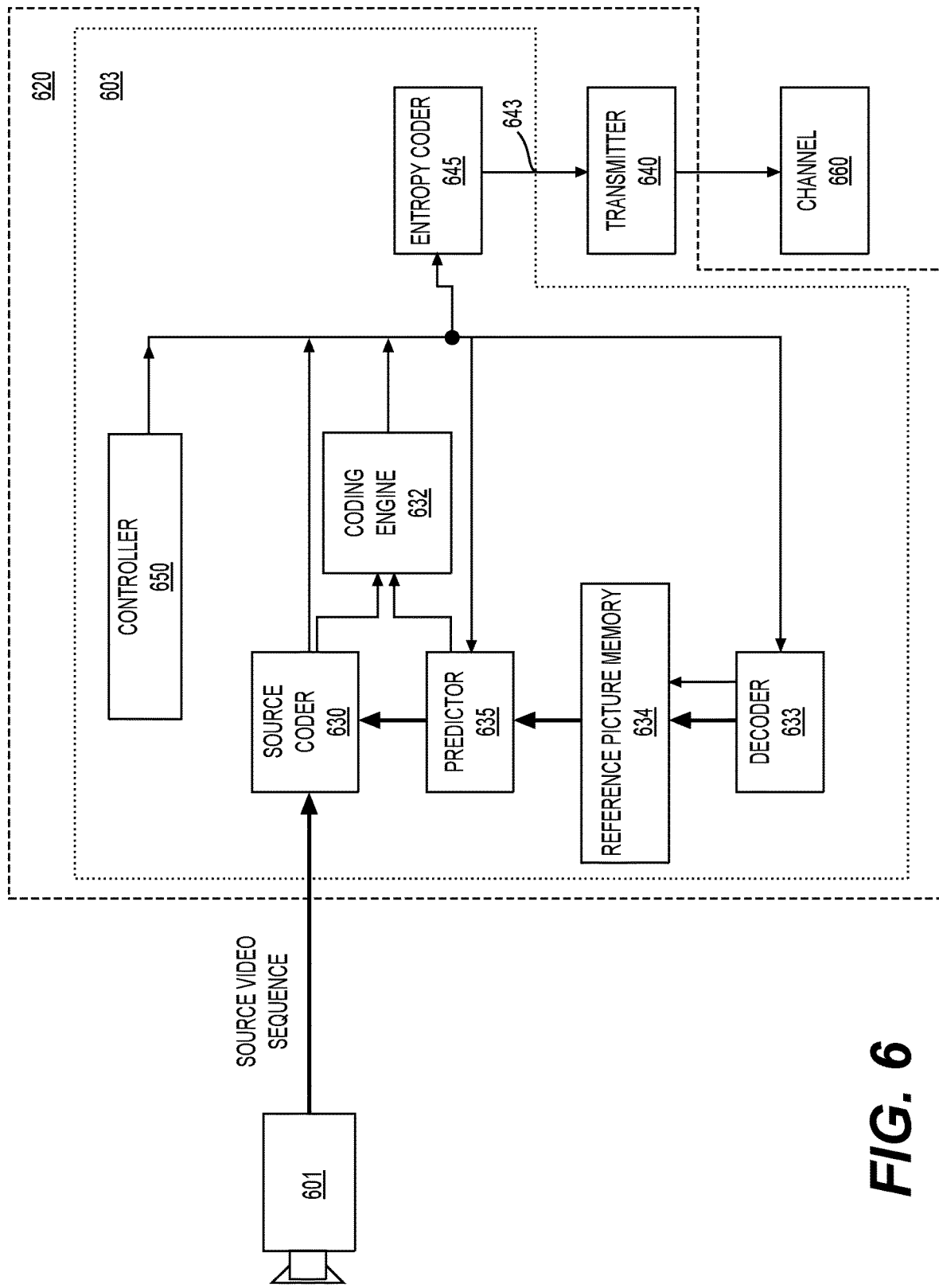
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
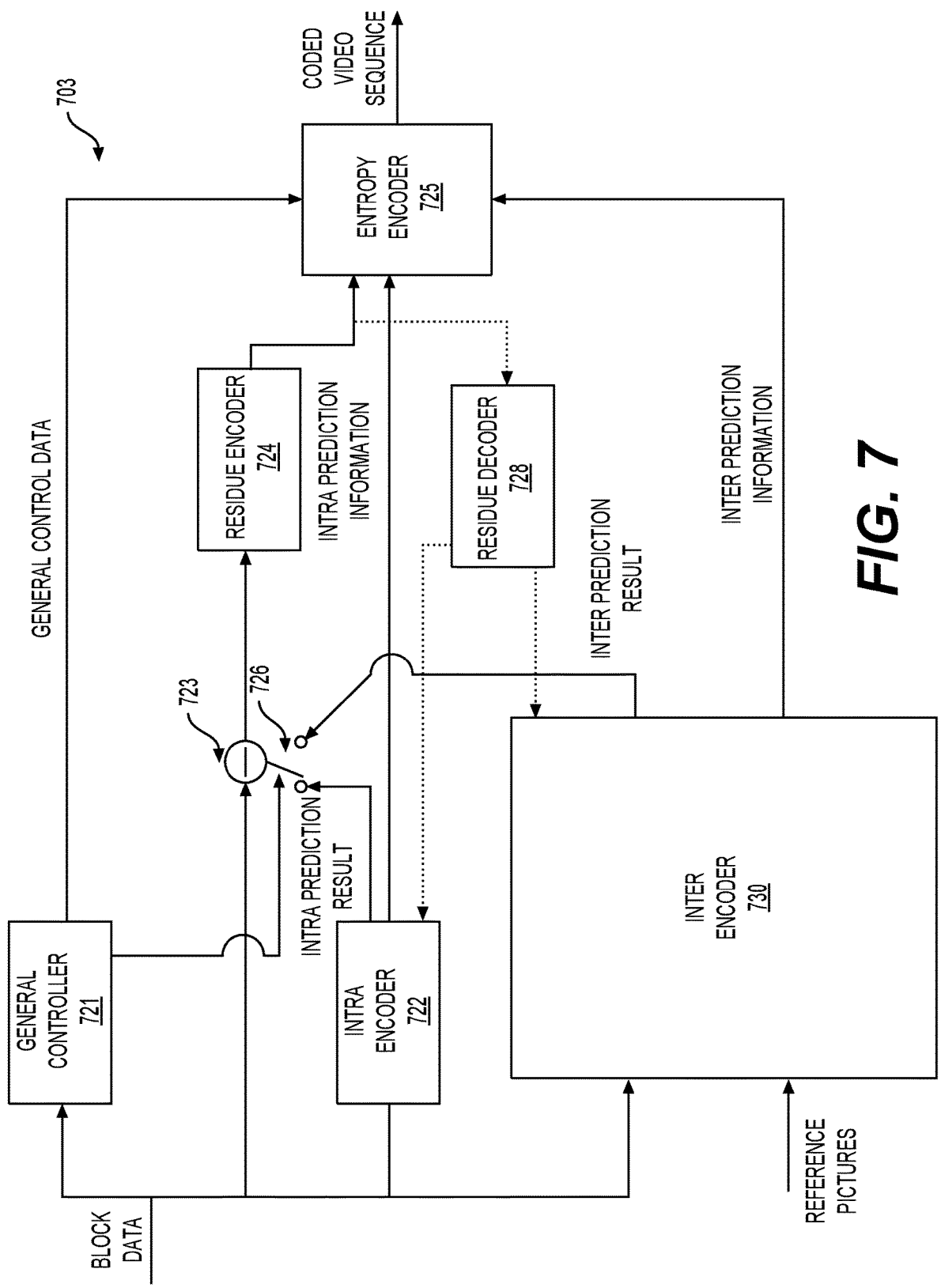
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
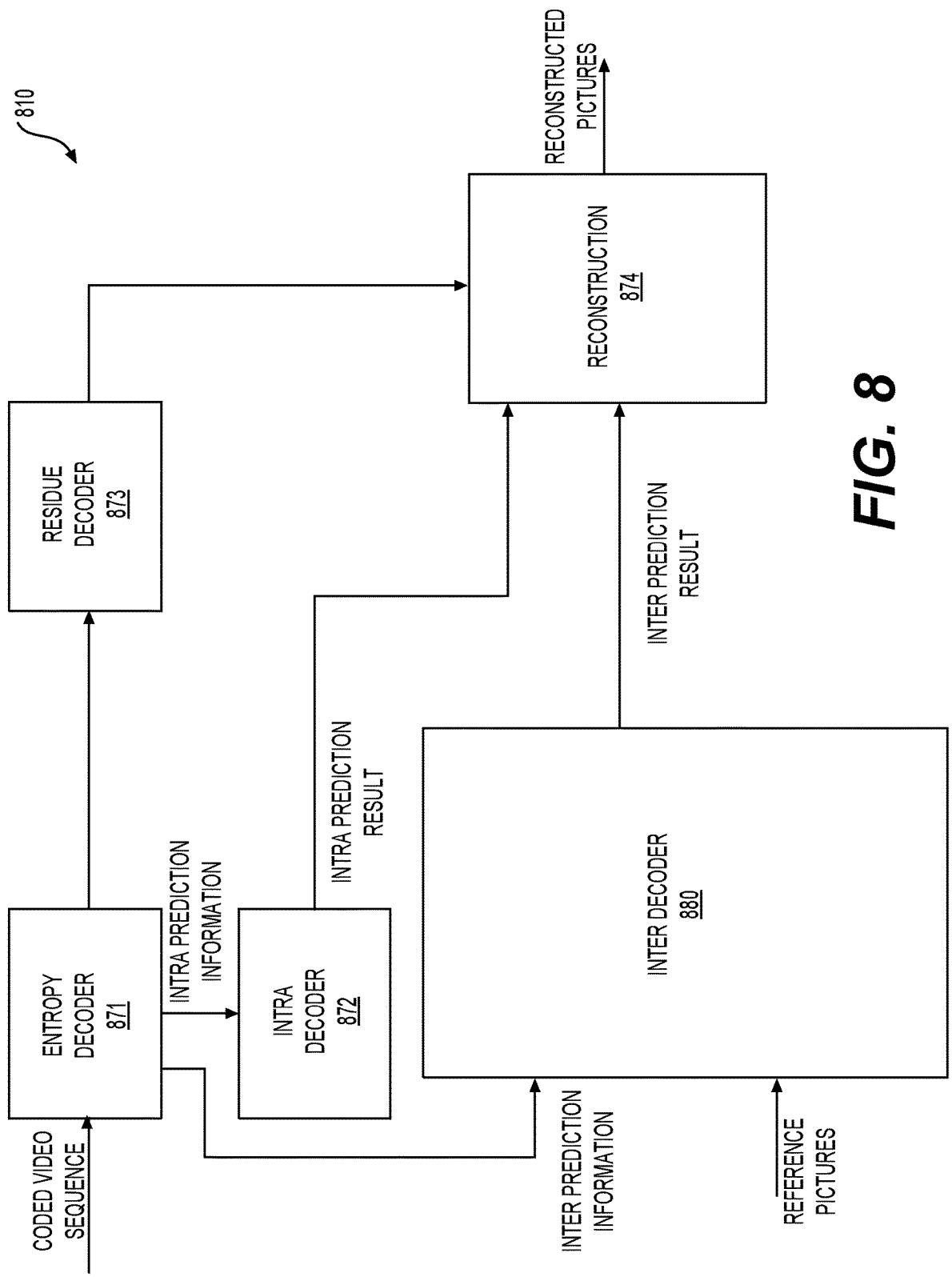
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Video coding technologies related to context design for entropy coding of an index such as a secondary transform index are disclosed. The index can be used to identify one among a set of non-separable secondary transforms used for coding (e.g., encoding and/or decoding) a block. The context design for entropy coding of the index can be applicable in any suitable video coding format or standard. The video coding format can include an open video coding format designed for video transmissions over the Internet, such as AOMedia Video 1 (AV1) or a next generation AOMedia Video format beyond the AV1. The video coding standard can include High Efficiency Video Coding (HEVC) standard, a next-generation video coding beyond HEVC (e.g., the Versatile Video Coding (VVC)), or the like.

Figure 9:
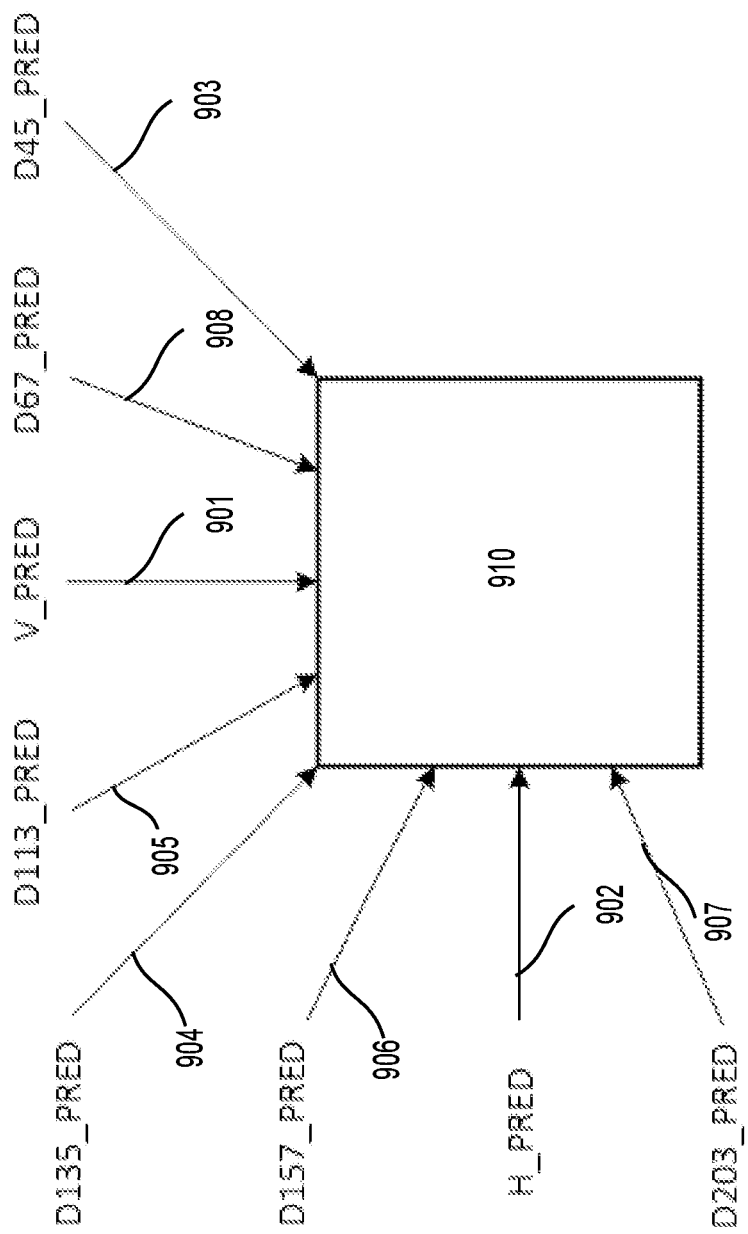
FIG. 9 shows an example of nominal modes for a coding block according to an embodiment of the disclosure.

Various intra prediction modes can be used in intra prediction, for example, in AV1, VVC, and/or the like. In an embodiment, such as in the AV1, directional intra prediction is used. In the directional intra prediction, predicted samples for a block can be generated by extrapolating from neighboring reconstructed samples along a direction. The direction corresponds to an angle. A mode used in the directional intra prediction to predict the predicted samples for the block can be referred to as a directional mode (also referred to as directional prediction modes, directional intra modes, directional intra prediction modes, angular modes). Each directional mode can correspond to a different angle or a different direction. In an example, such as in an open video coding format VP9, eight directional modes corresponding to eight angles from 45° to 207°, as shown in FIG. 9. The eight directional modes can also be referred to as nominal modes (e.g., V_PRED, H_PRED, D45_PRED, D135_PRED, D113_PRED, D157_PRED, D203_PRED, and D67_PRED). To exploit more varieties of spatial redundancy in directional textures, for example in the AV1, directional modes can be extended, for example, beyond the eight nominal modes to an angular set with finer granularity and more angles (or directions), as shown in FIG. 9.

FIG. 9 shows an example of nominal modes for a coding block (CB) (910) according to an embodiment of the disclosure. Certain angles (referred to as nominal angles) can correspond to nominal modes. In an example, eight nominal angles (or nominal intra angles) (901)-(908) correspond to the eight nominal modes (e.g., V_PRED, H_PRED, D45_PRED, D135_PRED, D113_PRED, D157_PRED, D203_PRED, and D67_PRED), respectively. The eight nominal angles (901)-(908) as well as the eight nominal modes can be referred to as V_PRED, H_PRED, D45_PRED, D135_PRED, D113_PRED, D157_PRED, D203_PRED, and D67_PRED, respectively. A nominal mode index can indicate a nominal mode (e.g., one of the eight nominal modes). In an example, the nominal mode index is signaled.

Further, each nominal angle can correspond to a plurality of finer angles (e.g., seven finer angles), and thus 56 angles (or prediction angles) or 56 directional modes (or angular modes, directional intra prediction modes) can be used, for example, in the AV1. Each prediction angle can be presented by a nominal angle and an angular offset (or an angle delta). The angular offset can be obtained by multiplying an offset integer I (e.g., −3, −2, −1, 0, 1, 2, or 3) with a step size (e.g., 3°). In an example, the prediction angle is equal to a sum of the nominal angle and the angular offset. In an example, such as in the AV1, the nominal modes (e.g., the eight nominal modes (901)-(908)) together with certain non-angular smooth modes (e.g., five non-angular smooth modes such as a DC mode, a PAETH mode, a SMOOTH mode, a vertical SMOOTH mode, and a horizontal SMOOTH mode as described below) can be signaled. Subsequently, if a current prediction mode is a directional mode (or an angular mode), an index can be further signaled to indicate the angular offset (e.g., the offset integer I) corresponding to the nominal angle. In an example, the directional mode (e.g., one of the 56 directional modes) can be determined based on the nominal mode index and the index indicating the angular offset from the nominal mode. In an example, to implement directional prediction modes via a generic way, the 56 directional modes such as used in the AV1 are implemented with a unified directional predictor that can project each pixel to a reference sub-pixel location and interpolate the reference pixel by a 2-tap bilinear filter.

Non-directional smooth intra predictors (also referred to as non-directional smooth intra prediction modes, non-directional smooth modes, non-angular smooth modes) can be used in intra prediction for a block, such as a CB. In some examples (e.g., in the AV1), five non-directional smooth intra prediction modes include the DC mode or the DC predictor (e.g., DC), the PAETH mode or the PAETH predictor (e.g., PAETH), the SMOOTH mode or the SMOOTH predictor (e.g., SMOOTH), the vertical SMOOTH mode (referred to as the SMOOTH_V mode, the SMOOTH_V predictor, the SMOOTH_V), and the horizontal SMOOTH mode (referred to as the SMOOTH_H mode, the SMOOTH_H predictor, or SMOOTH_H).

Figure 10:
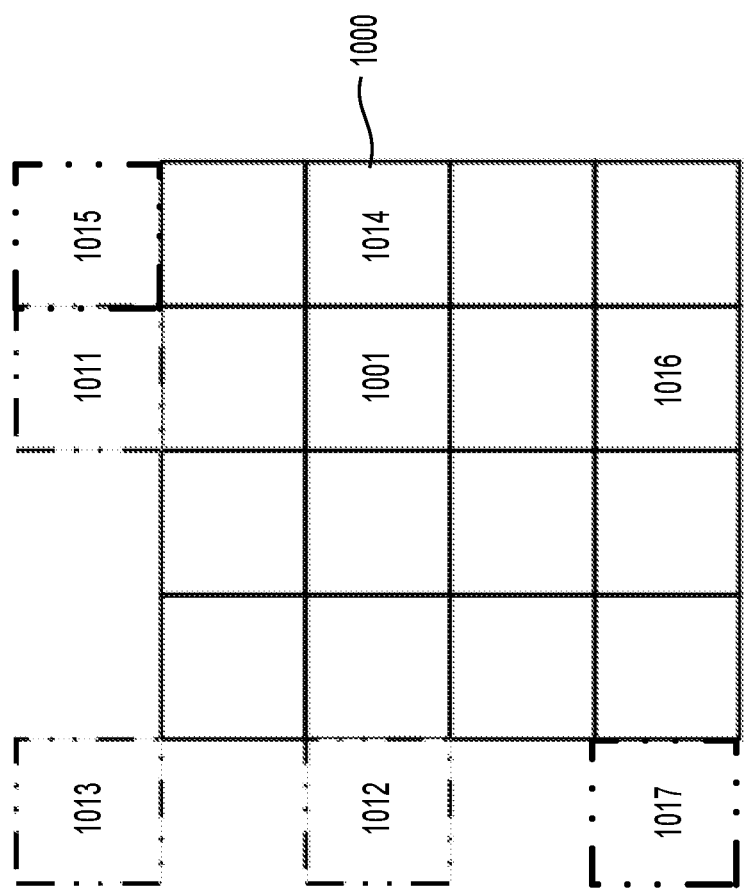
FIG. 10 shows examples for non-directional smooth intra prediction according to aspects of the disclosure.

FIG. 10 shows examples for non-directional smooth intra prediction modes (e.g., the DC mode, the PAETH mode, the SMOOTH mode, the SMOOTH_V mode, and the SMOOTH_H mode) according to aspects of the disclosure. To predict a sample (1001) in a CB (1000) based on the DC predictor, an average of a first value of a left neighboring sample (1012) and a second value of an above neighboring sample (or a top neighboring sample) (1011) can be used as a predictor.

To predict the sample (1001) based on the PAETH predictor, the first value of the left neighboring sample (1012), the second value of the top neighboring sample (1011), and a third value for a top-left neighboring sample (1013) can be obtained. Then, a reference value is obtained using Eq. 1.

$$\text{reference value} = \text{first value} + \text{second value} - \text{third value} \quad \text{(Eq. 1)}$$

One of the first value, the second value, and the third value that is closest to the reference value can be set as the predictor for the sample (1001).

The SMOOTH_V mode, the SMOOTH_H mode, and the SMOOTH mode can predict the CB (1000) using a quadratic interpolation in a vertical direction, a horizontal direction, and an average of the vertical direction and the horizontal direction, respectively. To predict the sample (1001) based on the SMOOTH predictor, an average (e.g., a weighted combination) of the first value, the second value, a value of a right sample (1014), and a value of a bottom sample (1016) can be used. In various examples, the right sample (1014) and the bottom sample (1016) are not reconstructed, and thus, a value of a top-right neighboring sample (1015) and a value of a bottom-left neighboring sample (1017) can replace the values of the right sample (1014) and the bottom sample (1016), respectively. Accordingly, an average (e.g., a weighted combination) of the first value, the second value, the value of the top-right neighboring sample (1015), and the value of the bottom-left neighboring sample (1017) can be used as the SMOOTH predictor. To predict the sample (1001) based on the SMOOTH_V predictor, an average (e.g., a weighted combination) of the second value of the top neighboring sample (1011) and the value of the bottom-left neighboring sample (1017) can be used. To predict the sample (1001) based on the SMOOTH_H predictor, an average (e.g., a weighted combination) of the first value of the left neighboring sample (1012) and the value of the top-right neighboring sample (1015) can be used.

Figure 11:
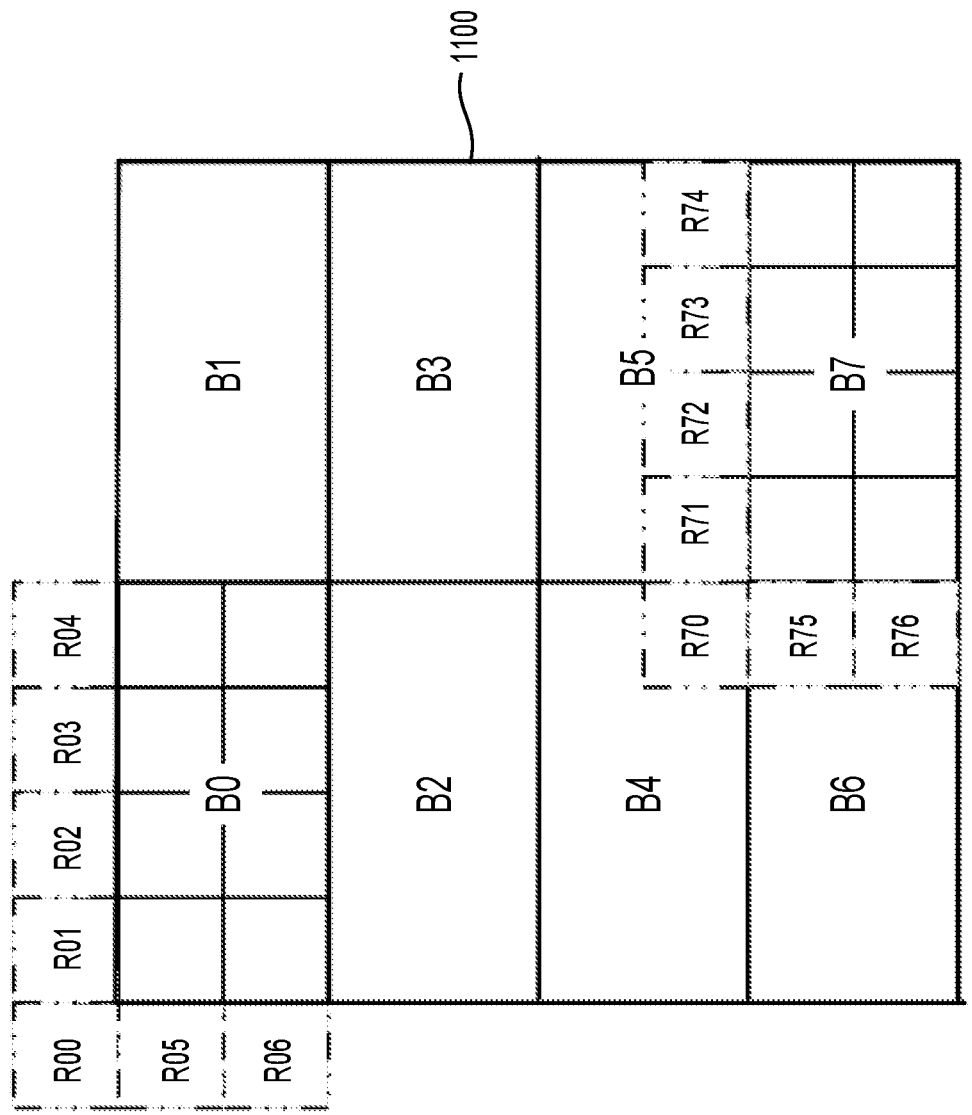
FIG. 11 shows an example of a recursive-filtering-based intra predictor according to an embodiment of the disclosure.

FIG. 11 shows an example of a recursive-filtering-based intra predictor (also referred to as a filter intra mode, or a recursive filtering mode) according to an embodiment of the disclosure. To capture a decaying spatial correlation with references on the edges, a filter intra mode can be used for a block, such as a CB (1100). In an example, the CB (1100) is a luma block. The luma block (1100) can be divided into multiple patches (e.g., eight 4×2 patches B0-B7). Each of the patches B0-B7 can have a plurality of neighboring samples. For example, the patch B0 has seven neighboring samples (or seven neighbors) R00-R06 including four top neighboring samples R01-R04, two left neighboring samples R05-R06, and a top-left neighboring sample R00. Similarly, the patch B7 has seven neighboring samples R70-R76 including four top neighboring samples R71-R74, two left neighboring samples R75-R76, and a top-left neighboring sample R70.

In some examples, multiple (e.g., five) filter intra modes (or multiple recursive filtering modes) are pre-designed, for example, for the AV1. Each filter intra mode can be represented by a set of eight 7-tap filters reflecting correlation between samples (or pixels) in a corresponding 4×2 patch (e.g., B0) and seven neighbors (e.g., R00-R06) that are adjacent to the 4×2 patch B0. Weighting factors for the 7-tap filter can be position dependent. For each of the patches B0-B7, the seven neighbors (e.g., R00-R06 for B0, R70-R76 for B7) can be used to predict the samples in the corresponding patch. In an example, the neighbors R00-R06 are used to predict the samples in the patch B0. In an example, the neighbors R70-R76 are used to predict the samples in the patch B7. For certain patches in the CB (1100), such as the patch B0, all the seven neighbors (e.g., R00-R06) are already reconstructed. For other patches in the CB (1100), at least one of the seven neighbors is not reconstructed, and thus predicted value(s) of immediate neighbor(s) (or prediction sample(s) of immediate neighbor(s)) can be used as reference(s). For example, the seven neighbors R70-R76 of the patch B7 are not reconstructed, so the prediction samples of the immediate neighbors can be used.

A chroma sample can be predicted from a luma sample. In an embodiment, a chroma from luma mode (e.g., a CfL mode, a CfL predictor) is a chroma-only intra predictor that can model chroma samples (or pixels) as a linear function of coincident reconstructed luma samples (or pixels). For example, the CfL prediction can be expressed using Eq. 2 as below.

$$CfL(\alpha) = \alpha L^A + D \quad \text{(Eq. 2)}$$

where $L^A$ denotes an AC contribution of a luma component, $\alpha$ denotes a scaling parameter of the linear model, and D denotes a DC contribution of a chroma component. In an example, reconstructed luma pixels are subsampled based on a chroma resolution, and an average value is subtracted to form the AC contribution (e.g., $L^A$). To approximate a chroma AC component from the AC contribution, instead of requiring a decoder to calculate the scaling parameter a, in some examples, such as in the AV1, the CfL mode determines the scaling parameter a based on original chroma pixels and signals the scaling parameter a in a bitstream, thus reducing decoder complexity and yielding a more precise prediction. The DC contribution of the chroma component can be computed using an intra DC mode. The intra DC mode can be sufficient for most chroma content and have mature fast implementations.

Figure 12:
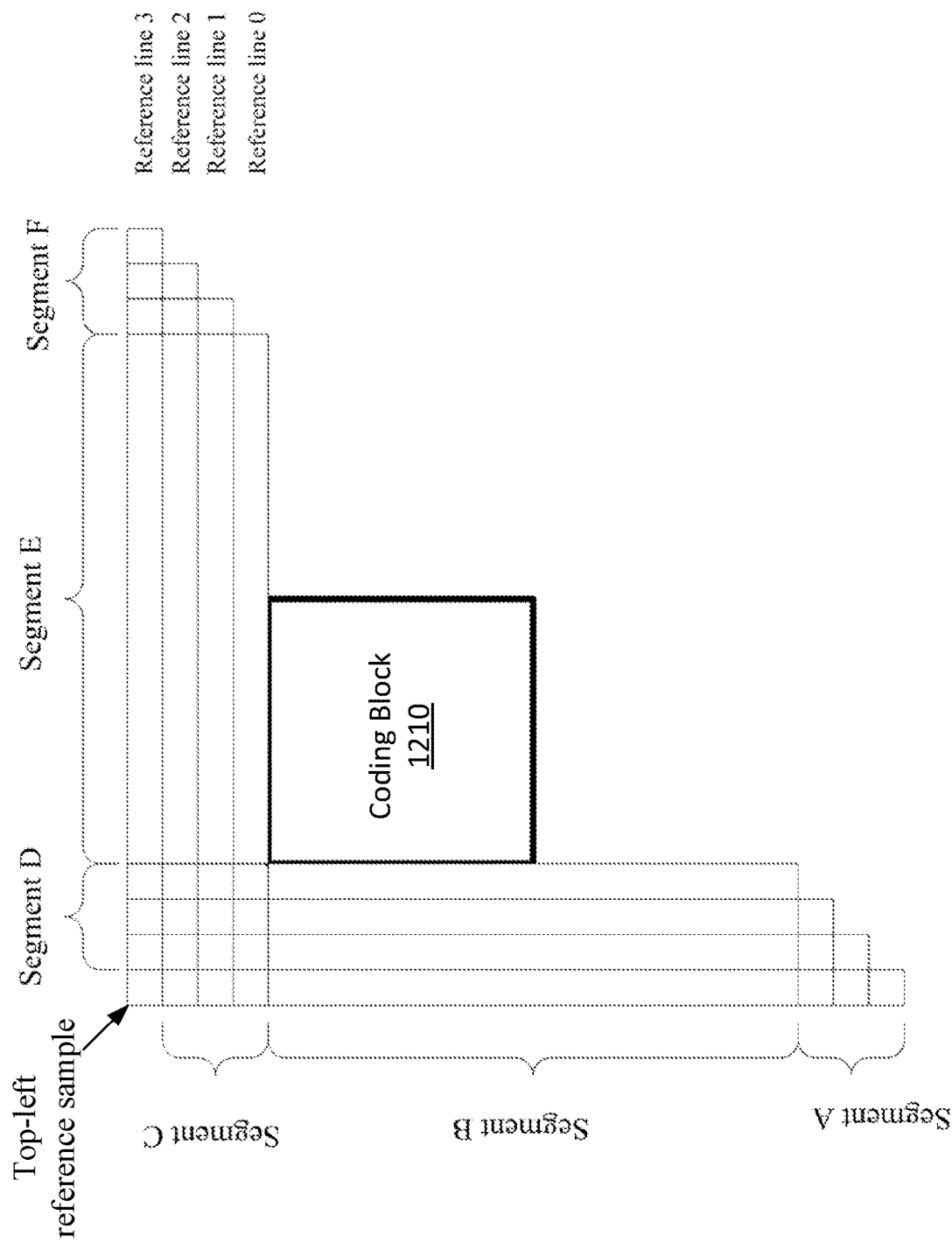
FIG. 12 shows an example of multiple reference lines for a coding block according to an embodiment of the disclosure.

Multi-line intra prediction can use more reference lines for intra prediction. A reference line can include multiple samples in a picture. In an example, the reference line includes samples in a row and samples in a column. In an example, an encoder can determine and signal a reference line used to generate the intra predictor. An index (also referred to as a reference line index) indicating the reference line can be signaled before intra prediction mode(s). In an example, only the MPMs are allowed when a nonzero reference line index is signaled. FIG. 12 shows an example of four reference lines for a CB (1210). Referring to FIG. 12, a reference line can include up to six segments, e.g., Segments A to F, and a top-left reference sample. For example, the reference line 0 includes the Segments B and E and a top-left reference sample. For example, the reference line 3 includes the Segments A to F and a top-left reference sample. The Segment A and F can be padded with closest samples from the Segment B and E, respectively. In some examples, such as in the HEVC, only one reference line (e.g., the reference line 0 that is adjacent to the CB (1210)) is used for intra prediction. In some examples, such as in the VVC, multiple reference lines (e.g., the reference lines 0, 1, and 3) are used for intra prediction.

In general, a block can be predicted using one or a suitable combination of various intra prediction modes such as described above with references to FIGS. 9-12.

Figure 13:
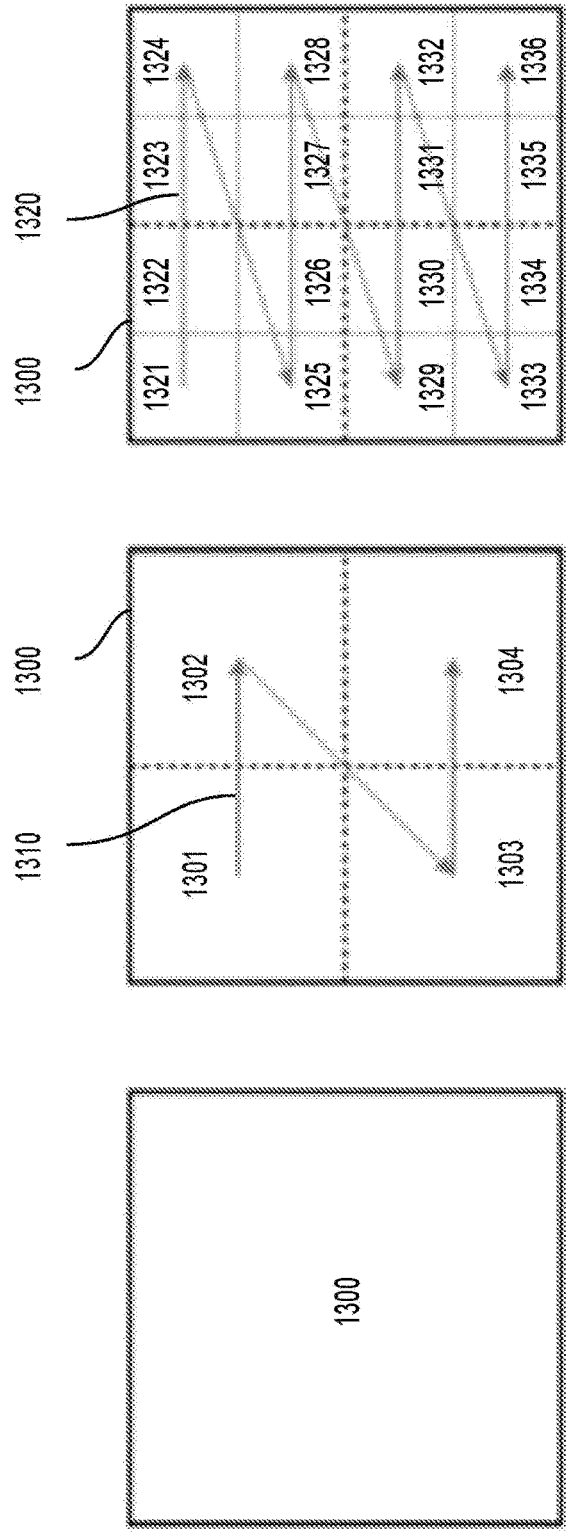
FIG. 13 shows an example of transform block partition on a block according to an embodiment of the disclosure.
Figure 14:
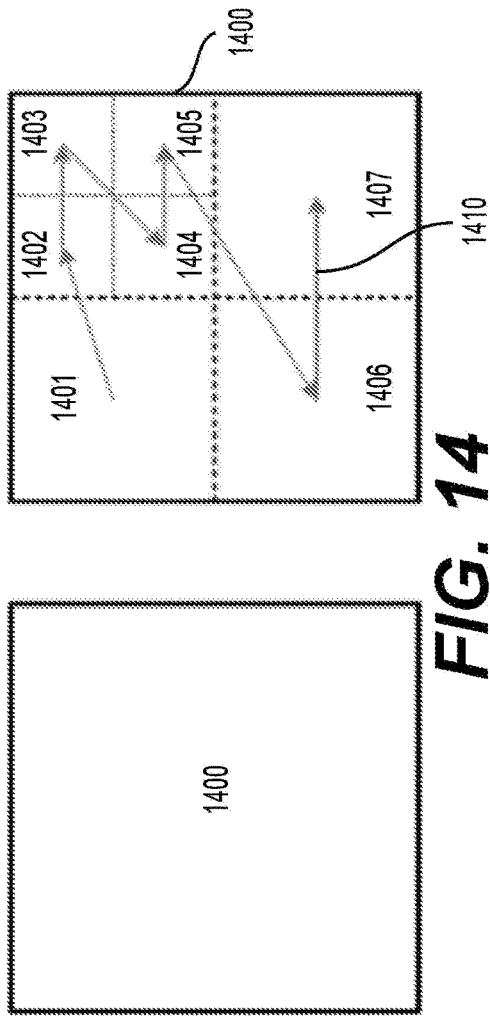
FIG. 14 shows an example of transform block partition on a block according to an embodiment of the disclosure.

Transform block partition (also referred to as transform partition, transform unit partition) can be implemented to partition a block into multiple TUs or multiple TBs. FIGS. 13-14 show exemplary transform block partitions according to embodiments of the disclosure. In some examples, such as in AV1, both intra coded blocks and inter coded blocks can be further partitioned into multiple transform units with a partitioning depth up to multiple levels (e.g., 2 levels). The multiple transform units resulting from the transform block partition can be referred to as TBs. A transform (e.g., a primary transform and/or a secondary transform such as described below) can be performed on each of the multiple TUs or the multiple TBs. Accordingly, multiple transforms can be performed on the block that is partitioned into the multiple transform units or multiple TBs.

For an intra coded block, the transform partition can be performed such that transform blocks associated with the intra coded block have a same size, and the transform blocks can be coded in a raster scan order. Referring to FIG. 13, transform block partition can be performed on a block (e.g., an intra coded block) (1300). The block (1300) can be partitioned into transform units, such as four transform units (e.g., TBs) (1301)-(1304), and a partitioning depth is 1. The four transform units (e.g., TBs) (1301)-(1304) can have a same size, and can be coded in a raster scan order (1310) from the transform unit (1301) to the transform unit (1304). In an example, the four transform units (e.g., TBs) (1301)-(1304) are transformed separately, for example, using different transform kernels. In some examples, each of the four transform units (e.g., TBs) (1301)-(1304) is further partitioned into four transform unit. For example, the transform unit (1301) is partitioned into transform units (1321), (1322), (1325), and (1326), the transform unit (1302) is partitioned into transform units (1323), (1324), (1327), and (1328), the transform unit (1303) is partitioned into transform units (1329), (1330), (1333), and (1334), and the transform unit (1304) is partitioned into transform units (1331), (1332), (1335), and (1336). The partitioning depth is 2. The transform units (e.g., TBs) (1321)-(1336) can have a same size, and can be coded in a raster scan order (1320) from the transform unit (1321) to the transform unit (1336).

For inter coded blocks, the transform partition can be performed in a recursive manner with a partitioning depth up to multiple levels (e.g., two levels). The transform partition can support any suitable transform unit sizes and shapes. The transform unit shapes can include a square shape and a non-square shape (e.g., a non-square rectangular shape) having any suitable aspect ratio. The transform unit sizes can range from 4×4 to 64×64. The aspect ratio of the transform unit (e.g., a ratio of a width of the transform unit over a height of the transform unit) can be 1:1 (square), 1:2, 2:1, 1:4, 4:1, or the like. The transform partition can support 1:1 (square), 1:2, 2:1, 1:4, and/or 4:1 transform unit sizes ranging from 4×4 to 64×64. Referring to FIG. 14, transform block partition can be performed on a block (e.g., an inter coded block) (1400) recursively. For example, the block (1400) is partitioned into transform units (1401)-(1407). The transform units (e.g., TBs) (1401)-(1407) can have different sizes and can be coded in a raster scan order (1410) from the transform unit (1401) to the transform unit (1407). In an example, partitioning depths of the transform units (1401), (1406), and (1407) are 1, and partitioning depths of the transform units (1402)-(1405) are 2.

In an example, if a coding block is smaller than or equal to 64×64, the transform partition can only be applied to a luma component. In an example, the coding block refers to a CTB.

If a coding block width W or a coding block height H is greater than 64, the coding block can be implicitly split into multiple TBs where the coding block is a luma coding block. A width of one of the multiple TBs can be a minimum of W and 64 and a height of the one of the multiple TBs can be a minimum of H and 64.

If the coding block width W or the coding block height H is greater than 64, the coding block can be implicitly split into multiple TBs where the coding block is a chroma coding block. A width of one of the multiple TBs can be a minimum of W and 32 and a height of the one of the multiple TBs can be a minimum of H and 32.

Embodiments of primary transforms, such as those used in AOMedia Video 1 (AV1), are described below. A forward transform (e.g., in an encoder) can be performed on a transform block (TB) including residuals (e.g., residuals in a spatial domain) to obtain a TB including transform coefficients in a frequency domain (or a spatial frequency domain). The TB including the residuals in the spatial domain can be referred to as a residual TB and the TB including the transform coefficients in the frequency domain can be referred to as a coefficient TB. In an example, the forward transform includes a forward primary transform that can transform the residual TB into the coefficient TB. In an example, the forward transform includes a forward primary transform and a forward secondary transform where the forward primary transform can transform the residual TB into an intermediate coefficient TB, and the forward secondary transform can transform the intermediate coefficient TB into the coefficient TB.

An inverse transform (e.g., in an encoder or in a decoder) can be performed on the coefficient TB in the frequency domain to obtain the residual TB in the spatial domain. In an example, the inverse transform includes an inverse primary transform that can transform the coefficient TB into the residual TB. In an example, the inverse transform includes an inverse primary transform and an inverse secondary transform where the inverse secondary transform can transform the coefficient TB into the intermediate coefficient TB and the inverse primary transform can transform the intermediate coefficient TB into the residual TB.

In general, a primary transform can refer to the forward primary transform or the inverse primary transform where the primary transform is performed between the residual TB and the coefficient TB. In some embodiments, the primary transform can be a separable transform where the 2D primary transform can include a horizontal primary transform (also referred to as a horizontal transform) and a vertical primary transform (also referred to as a vertical transform). A secondary transform can refer to the forward secondary transform or the inverse secondary transform where the secondary transform is performed between the intermediate coefficient TB and the coefficient TB.

In order to support extended coding block partitions, such as described in the disclosure, multiple transform sizes (e.g., ranging from 4-point to 64-point for each dimension) and transform shapes (e.g., square, a rectangular shape with a width over a height ratio of 2:1, 1:2, 4:1, or 1:4) can be used, such as in AV1.

A 2D transform process can use hybrid transform kernels that can include a different 1D transform for each dimension of a coded residual block. Primary 1D transforms can include (a) a 4-point, an 8-point, a 16-point, a 32-point, a 64-point DCT-2; (b) a 4-point, an 8-point, a 16-point asymmetric DST (ADST) (e.g., a DST-4, a DST-7) and corresponding flipped versions (e.g., a flipped version or a FlipADST of an ADST can apply the ADST in a reverse order); and/or (c) a 4-point, an 8-point, a 16-point, a 32-point identity transform (IDTX). FIG. 15 shows examples of primary transform basis functions according to embodiments of the disclosure. The primary transform basis functions in the FIG. 15 example include basis functions for the DCT-2 and the asymmetric DSTs (DST-4 and DST-7) having an N-point input. The primary transform basis functions shown in FIG. 15 can be used in AV1.

The availability of hybrid transform kernels can be dependent on a transform block size and a prediction mode. FIG. 16A shows exemplary dependencies of the availability of various transform kernels (e.g., transform types shown in the first column and described in the second column) based on the transform block size (e.g., sizes shown in the third column) and the prediction mode (e.g., the intra prediction and the inter prediction shown in the third column). The exemplary hybrid transform kernels and the availability based on the prediction modes and transform block sizes can be used in AV1. Referring to FIG. 16A, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type (1610) is denoted by ADST_DCT as shown in the first column of FIG. 16A. The transform type (1610) includes an ADST in the vertical direction and a DCT in the horizontal direction as shown in the second column of FIG. 16A. According to the third column of FIG. 16A, the transform type (1610) is available for the intra prediction and the inter prediction when the block size is less than or equal to 16×16 (e.g., 16×16 samples, 16×16 luma samples).

In an example, a transform type (1620) is denoted by V_ADST as shown in the first column of FIG. 16A. The transform type (1620) includes an ADST in the vertical direction and an IDTX (i.e., an identity matrix) in the horizontal direction as shown in the second column of FIG. 16A. Thus, the transform type (1620) (e.g., V_ADST) is performed in the vertical direction and is not performed in the horizontal direction. According to the third column of FIG. 16A, the transform type (1620) is not available for the intra prediction regardless of the block size. The transform type (1620) is available for the inter prediction when the block size is less than 16×16 (e.g., 16×16 samples, 16×16 luma samples).

In an example, FIG. 16A is applicable for a luma component. For a chroma component, a transform type (or a transform kernel) selection can be performed implicitly. In an example, for intra prediction residuals, the transform type can be selected according to an intra prediction mode, as shown in FIG. 16B. In an example, transform type selections shown in FIG. 16 B are applicable to a chroma component. For inter prediction residuals, the transform type can be selected according to the transform type selection of a co-located luma block. Therefore, in an example, a transform type for the chroma component is not signaled in a bitstream.

Line graph transforms (LGT) can be used in transforms such as a primary transform, for example, in AOMedia Video 2 (AV2). 8-bit/10-bit transform cores can be used in AV2. In an example, LGTs include various DCTs, discrete sine transforms (DSTs), as described below. LGTs can include 32-point and 64-point 1-dimensional (1D) DSTs.

Graphs are generic mathematical structures including sets of vertices and edges that can be used for modelling affinity relations between objects of interest. Weighted graphs where a set of weights are assigned to edges and optionally to vertices can provide sparse representations for robust modeling of signals/data. LGTs can improve coding efficiency by providing a better adaptation for diverse block statistics. Separable LGTs can be designed and optimized by learning line graphs from data to model underlying row and column-wise statistics of residual signals of a block, and associated generalized graph Laplacian (GGL) matrices can be used to derive the LGTs.

Figures 16C, 16D:
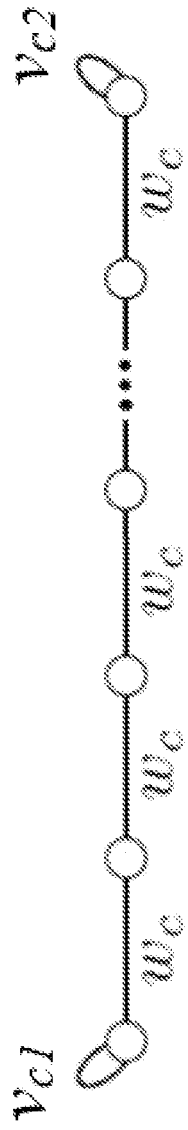
FIG. 16C shows an example of a generic line graph transform (LGT) characterized by self-loop weights and edge weights according to an embodiment of the disclosure.
FIG. 16D shows an exemplary generalized graph Laplacian (GGL) matrix according to an embodiment of the disclosure.

FIG. 16C shows an example of a generic LGT characterized by self-loop weights (e.g., $v_{c1}$, $v_{c2}$) and edge weights $w_c$ according to an embodiment of the disclosure. Given a weighted graph G (W, V), the GGL matrix can be defined as below.

$$L_c = D - W + V \qquad \text{(Eq. 3)}$$

where W can be an adjacency matrix including the non-negative edge weights $w_c$, D can be a diagonal degree matrix, and V can be a diagonal matrix denoting the self-loop weights $v_{c1}$ and $v_{c2}$. FIG. 16D shows an example of the matrix $L_c$.

The LGT can be derived by an Eigen-decomposition of the GGL matrix $L_c$ as below.

$$L_c = U \Phi U^T \qquad \text{(Eq. 4)}$$

where columns of an orthogonal matrix U can be the basis vectors of the LGT, and $\Phi$ can be a diagonal eigenvalue matrix.

In various examples, certain DCTs and DSTs (e.g., DCT-2, DCT-8, and DST-7), are subsets of a set of LGTs derived from certain forms of the GGLs. The DCT-2 can be derived by setting $v_{c1}$ to 0 (e.g., $v_{c1}=0$). The DST-7 can be derived by setting $v_{c1}$ to $w_c$ (e.g., $v_{c1}=w_e$). The DCT-8 can be derived by setting $v_{c2}$ to $w_c$ (e.g., $v_{c2}=w_c$). The DST-4 can be derived by setting $v_{c1}$ to $2w_c$ (e.g., $v_{c1}=2w_c$). The DCT-4 can be derived by setting $v_{c2}$ to $2w_c$ (e.g., $v_{c2}=2w_c$).

In some examples, such as in AV2, the LGTs can be implemented as matrix multiplications. A 4-point (4p) LGT core can be derived by setting $v_{c1}$ to $2w_c$ in Lc, and thus the 4p LGT core is the DST-4. An 8-point (8p) LGT core can be derived by setting $v_{c1}$ to $1.5w_c$ in Lc. In an example, an LGT core, such as a 16-point (16p) LGT core, a 32-point (32p) LGT core, or a 64-point (64p) LGT core, can be derived by setting $v_{c1}$ to be $w_c$ and $v_{c2}$ to be 0 and the LGT core can become DST-7.

A transform, such as a primary transform, a secondary transform, can be applied to a block such as a CB. In an example, a transform includes a combination of a primary transform, a secondary transform. A transform can be a non-separable transform, a separable transform, or a combination of a non-separable transform and a separable transform.

Figure 17:
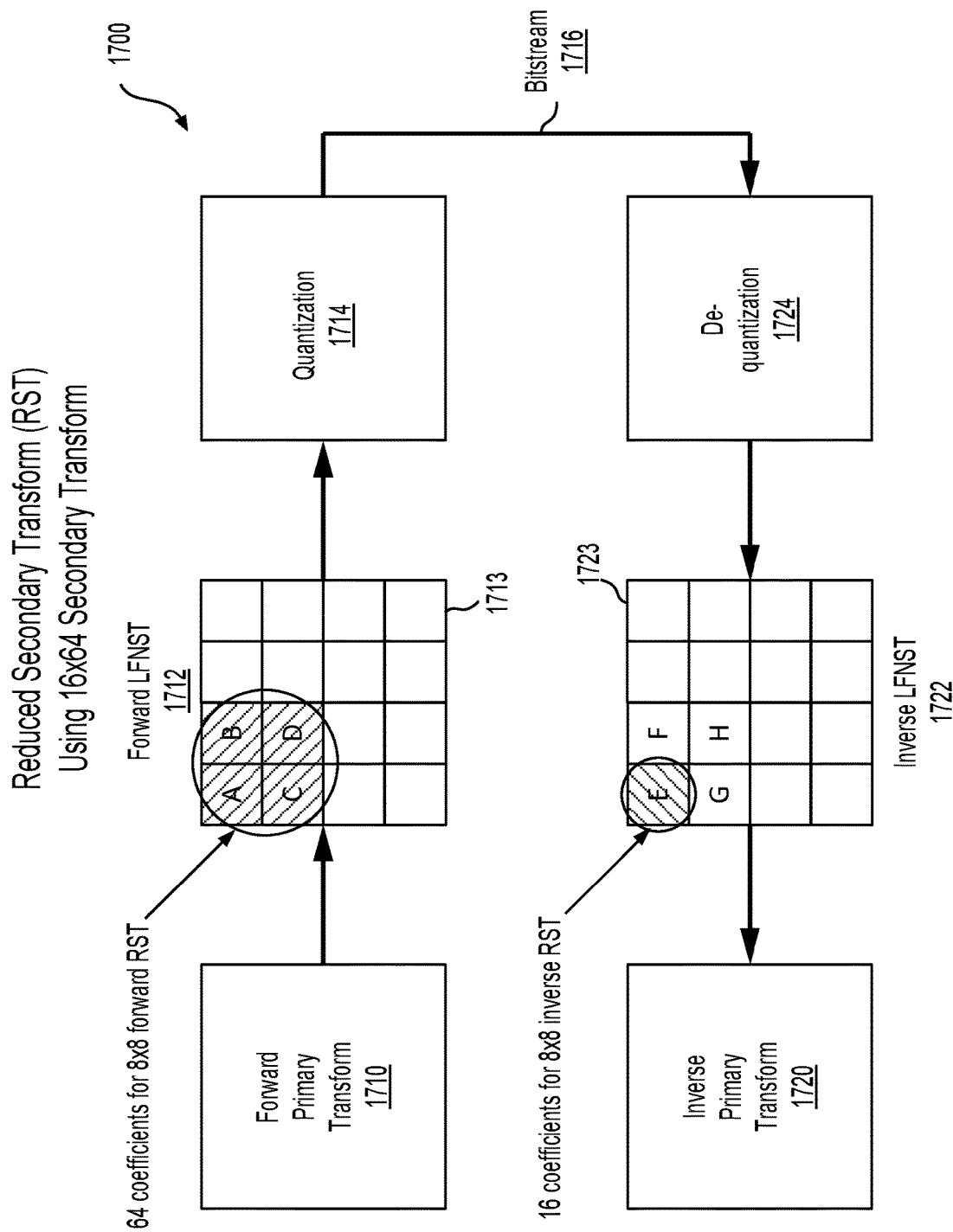
FIGS. 17-18 show examples of two transform coding processes (1700) and (1800) using a 16×64 transform and a 16×48 transform, respectively according to embodiments of the disclosure.
Figure 18:
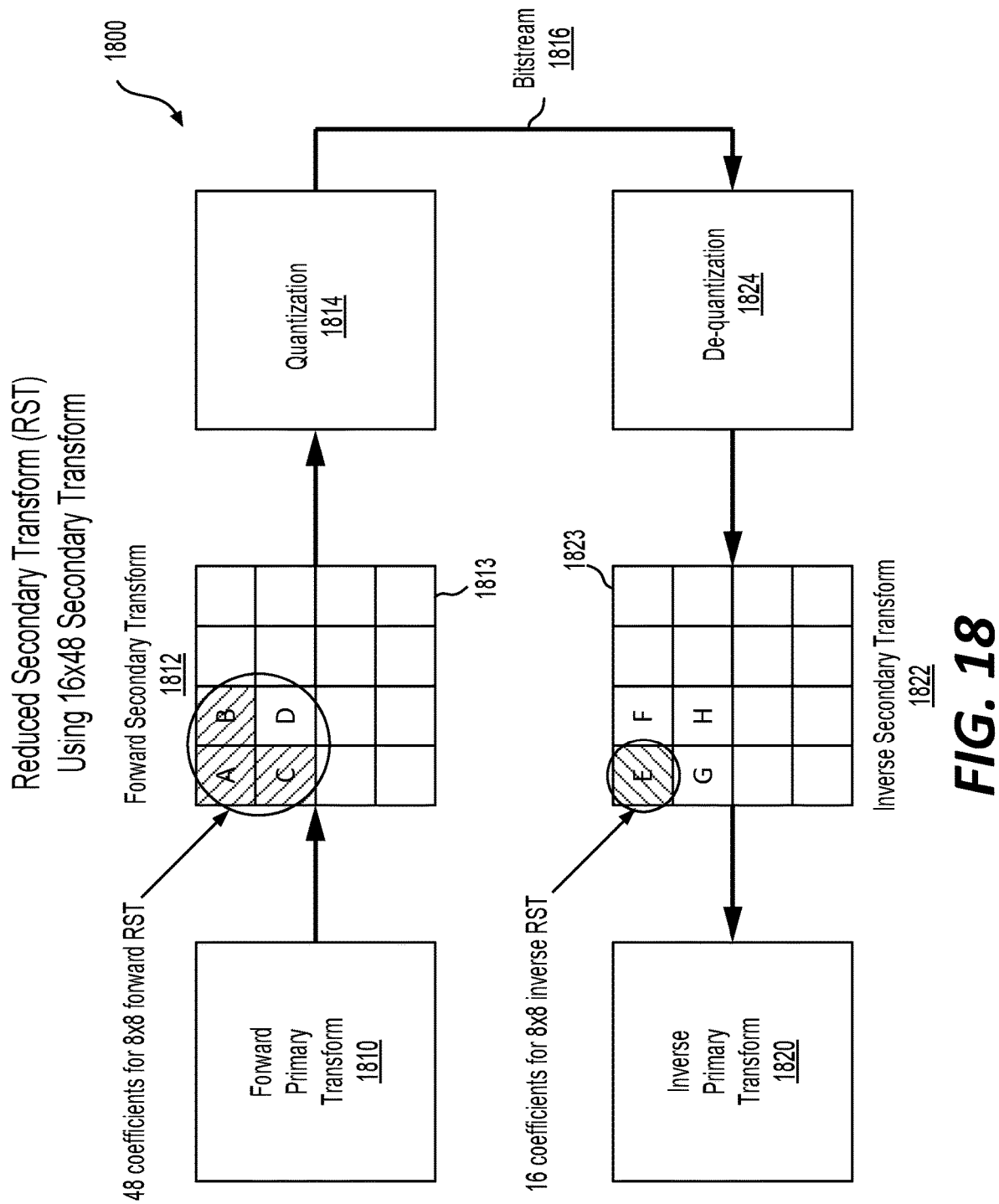

A secondary transform can be performed such as in VVC. In some examples, such as in VVC, a low-frequency non-separable transform (LFNST), which is also known as a reduced secondary transform (RST), can be applied between a forward primary transform and quantization at an encoder side and between de-quantization and an inverse primary transform at a decoder side as shown in FIGS. 17-18 to further de-correlate primary transform coefficients.

Application of a non-separable transform, which can be used in an LFNST, can be described as follows using a 4×4 input block (or an input matrix) X as an example (shown in Eq. 5). To apply the 4×4 non-separable transform (e.g., the LFNST), the 4×4 input block X can be represented by a vector $\vec{X}$, as shown in Eqs. 5-6.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 5)}$$

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \text{(Eq. 6)}$$

The non-separable transform can be calculated as $\vec{F} = T \cdot \vec{X}$, where $\vec{F}$ indicates a transform coefficient vector, and T is a 16×16 transform matrix. The 16×1 coefficient vector $\vec{F}$ can be subsequently reorganized into a 4×4 output block (or an output matrix, a coefficient block) using a scanning order (e.g., a horizontal scanning order, a vertical scanning order, a zigzag scanning order, or a diagonal scanning order) for the 4×4 input block. The transform coefficients with smaller indices can be placed with smaller scanning indices in the 4×4 coefficient block.

A non-separable secondary transform can be applied to a block (e.g., a CB). In some examples, such as in the VVC, the LFNST is applied between a forward primary transform and quantization (e.g., at an encoder side) and between de-quantization and an inverse primary transform (e.g., at a decoder side) as shown in FIGS. 17-18.

FIGS. 17-18 show examples of two transform coding processes (1700) and (1800) using a 16×64 transform (or a 64×16 transform depending on whether the transform is a forward or inverse secondary transform) and a 16×48 transform (or a 48×16 transform depending on whether the transform is a forward or inverse secondary transform), respectively. Referring to FIG. 17, in the process (1700), at an encoder side, a forward primary transform (1710) can first be performed over a block (e.g., a residual block) to obtain a coefficient block (1713). Subsequently, a forward secondary transform (or a forward LFNST) (1712) can be applied to the coefficient block (1713). In the forward secondary transform (1712), 64 coefficients of 4×4 sub-blocks A-D at a top-left corner of the coefficient block (1713) can be represented by a 64-length vector, and the 64-length vector can be multiplied with a transform matrix of 64×16 (i.e., a width of 64 and a height of 16), resulting in a 16-length vector. Elements in the 16-length vector are filled back into the top-left 4×4 sub-block A of the coefficient block (1713). The coefficients in the sub-blocks B-D can be zero. The resulting coefficients after the forward secondary transform (1712) are then quantized at a quantization step (1714), and entropy-coded to generate coded bits in a bitstream (1716).

The coded bits can be received at a decoder side, and entropy-decoded followed by a de-quantization step (1724) to generate a coefficient block (1723). An inverse secondary transform (or an inverse LFNST) (1722), such as an inverse RST8×8, can be performed to obtain 64 coefficients, for example, from the 16 coefficients at a top-left 4×4 sub-block E. The 64 coefficients can be filled back to the 4×4 sub-blocks E-H. Further, the coefficients in the coefficient block (1723) after the inverse secondary transform (1722) can be processed with an inverse primary transform (1720) to obtain a recovered residual block.

The process (1800) of the FIG. 18 example is similar to the process (1700) except that fewer (i.e., 48) coefficients are processed during the forward secondary transform (1712). Specifically, the 48 coefficients in the sub-blocks A-C are processed with a smaller transform matrix of a size of 48×16. Using the smaller transform matrix of 48×16 can reduce a memory size for storing the transform matrix and a number of calculations (e.g., multiplications, additions, subtractions, and/or the like), and thus can reduce computation complexity.

In an example, a 4×4 non-separable transform (e.g., a 4×4 LFNST) or an 8×8 non-separable transform (e.g., an 8×8 LFNST) is applied according to a block size of the block (e.g., the CB). The block size of the block can include a width, a height, or the like. For example, the 4×4 LFNST is applied for the block where a minimum of the width and the height is less than a threshold, such as 8 (e.g., min (the width, the height)<8). For example, the 8×8 LFNST is applied for the block where the minimum of the width and the height is larger than a threshold, such as 4 (e.g., min (width, height)>4).

A non-separable transform (e.g., the LFNST) can be based on a direct matrix multiplication approach, and thus can be implemented in a single pass without iteration. To reduce a non-separable transform matrix dimension and to minimize computational complexity and memory space to store transform coefficients, a reduced non-separable transform method (or RST) can be used in the LFNST. Accordingly, in the reduced non-separable transform, an N (e.g., N is 64 for an 8×8 non-separable secondary transform (NSST)) dimensional vector can be mapped to an R dimensional vector in a different space, where N/R (R<N) is a reduction factor. Hence, instead of an N×N matrix, an RST matrix is an R×N matrix as described in Eq. 7.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{(Eq. 7)}$$

In Eq. 7, R rows of the R×N transform matrix are R bases of the N dimensional space. The inverse transform matrix can be a transpose of the transform matrix (e.g., $T_{R \times N}$) used in the forward transform. For an 8×8 LFNST, a reduction factor of 4 can be applied, and a 64×64 direct matrix used in an 8×8 non-separable transform can be reduced to a 16×64 direct matrix, as shown in FIG. 17. Alternatively, a reduction factor larger than 4 can be applied, and the 64×64 direct matrix used in the 8×8 non-separable transform can be reduced to a 16×48 direct matrix, as shown in FIG. 18. Hence, a 48×16 inverse RST matrix can be used at a decoder side to generate core (primary) transform coefficients in an 8×8 top-left region.

Referring to FIG. 18, when the 16×48 matrix is applied instead of the 16×64 matrix with a same transform set configuration, an input to the 16×48 matrix includes 48 input data from three 4×4 blocks A, B, and C in a top-left 8×8 block excluding a right-bottom 4×4 block D. With a reduction in the dimension, a memory usage for storing LFNST matrices can be reduced, for example, from 10 KB to 8 KB with a minimal performance drop.

In order to reduce complexity, the LFNST can be restricted to be applicable if coefficients outside a first coefficient subgroup are non-significant. In an example, the LFNST can be restricted to be applicable only if all coefficients outside the first coefficient subgroup are non-significant. Referring to FIGS. 17-18, the first coefficient subgroup corresponds to the top-left block E, and thus the coefficients that are outside the block E are non-significant.

In an example, primary-only transform coefficients are non-significant (e.g., zero) when the LFNST is applied. In an example, all primary-only transform coefficients are zero when the LFNST is applied. The primary-only transform coefficients can refer to transform coefficients that are obtained from a primary transform without a secondary transform. Accordingly, an LFNST index signaling can be conditioned on a last-significant position, and thus avoiding an extra coefficient scanning in the LFNST. In some examples, the extra coefficient scanning is used to check significant transform coefficients at specific positions. In an example, the worst-case handling of the LFNST, for example, in terms of multiplications per pixel restricts the non-separable transform for a 4×4 block and an 8×8 block to an 8×16 transform and an 8×48 transform, respectively. In the above cases, the last-significant scan position can be less than 8 when the LFNST is applied. For other sizes, the last-significant scan position can be less than 16 when the LFNST is applied. For a CB of 4×N and N×4 and N is larger than 8, the restriction can imply that the LFNST is applied to a top-left 4×4 region in the CB. In an example, the restriction implies that the LFNST is applied only once to the top-left 4×4 region only in the CB. In an example, all the primary-only coefficients are non-significant (e.g., zero) when the LFNST is applied, a number of operations for the primary transform is reduced. From an encoder perspective, quantization of transform coefficients can be significantly simplified when the LFNST transform is tested. A rate-distortion optimized quantization can be done at maximum for the first 16 coefficients, for example, in a scanning order, remaining coefficients can be set to zero.

An LFNST transform (e.g., a transform kernel, a transform core, or a transform matrix) can be selected as described below. In an embodiment, multiple transform sets can be used, and one or more non-separable transform matrices (or kernels) can be included in each of the multiple transform sets in the LFNST. According to aspects of the disclosure, a transform set can be selected from the multiple transform sets, and a non-separable transform matrix can be selected from the one or more non-separable transform matrices in the transform set.

Table 1 shows an exemplary mapping from intra prediction modes to the multiple transform sets according to an embodiment of the disclosure. The mapping indicates a relationship between the intra prediction modes and the multiple transform sets. The relationship, such as indicated in Table 1, can be pre-defined and can be stored in an encoder and a decoder.

TABLE 1

Transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

Referring to Table 1, the multiple transform sets include four transform sets, e.g., transform sets 0 to 3 represented by a transform set index (e.g., Tr. set index) from 0 to 3, respectively. An index (e.g., an IntraPredMode) can indicate the intra prediction mode, and the transform set index can be obtained based on the index and Table 1. Accordingly, the transform set can be determined based on the intra prediction mode. In an example, if one of three cross component linear model (CCLM) modes (e.g., INTRA_LT_CCLM, INTRA_T_CCLM or INTRA_L_CCLM) is used for a CB (e.g., 81<=IntraPredMode<=83), the transform set 0 is selected for the CB.

As described above, each transform set can include the one or more non-separable transform matrices. One of the one or more non-separable transform matrices can be selected by an LFNST index that is, for example, explicitly signaled. The LFNST index can be signaled in a bitstream once per intra-coded CU (e.g., the CB), for example, after signaling transform coefficients. In an embodiment, each transform set includes two non-separable transform matrices (kernels), and the selected non-separable secondary transform candidate can be one of the two non-separable transform matrices. In some examples, the LFNST is not applied to a CB (e.g., the CB coded with a transform skip mode or a number of non-zero coefficients of the CB is less than a threshold). In an example, the LFNST index is not signaled for the CB when the LFNST is not to be applied to the CB. A default value for the LFNST index can be zero and not signaled, indicating that the LFNST is not applied to the CB.

In an embodiment, the LFNST is restricted to be applicable only if all coefficients outside the first coefficient subgroup are non-significant, coding of the LFNST index can depend on a position of the last significant coefficient. The LFNST index can be context coded. In an example, the context coding of the LFNST index does not depend on an intra prediction mode, and only a first bin is context coded. The LFNST can be applied to an intra-coded CU in an intra slice or in an inter slice, and for both Luma and Chroma components. If a dual tree is enabled, LFNST indices for Luma and Chroma components can be signaled separately. For an inter slice (e.g., the dual tree is disabled), a single LFNST index can be signaled and used for both the Luma and Chroma components.

Intra sub-partition (ISP) coding mode can be used. In the ISP coding mode, a luma intra-predicted block can be divided vertically or horizontally into 2 or 4 sub-partitions depending on a block size. In some examples, performance improvement is marginal when the RST is applied to every feasible sub-partition. Thus, in some examples, when an ISP mode is selected, the LFNST is disabled and the LFNST index (or an RST index) is not signaled. Disabling the RST or the LFNST for ISP-predicted residues can reduce coding complexity. In some examples, the LFNST is disabled and the LFNST index is not signaled when a matrix-based intra predication mode (MIP) is selected.

In some example, a CU larger than 64×64 is implicitly split (TU tiling) due to a maximum transform size restriction (e.g., 64×64), an LFNST index search can increase data buffering by four times for a certain number of decode pipeline stages. Therefore, the maximum size that the LFNST is allowed can be restricted to 64×64. In an example, the LFNST is enabled with a discrete cosine transform (DCT) type 2 (DCT-2) transform only.

In some examples, separable transform schemes may not be efficient for capturing directional texture patterns (e.g., edges which are along a 45° or a 135° direction). A non-separable transform scheme may improve coding efficiency, for example, in the above scenarios. To reduce computational complexity and memory usage, the non-separable transform scheme can be used as a secondary transform that is applied to low frequency transform coefficients that are obtained from a primary transform. The secondary transform can be applied to a block and information, for example, an index (e.g., a secondary transform index) indicating the secondary transform can be signaled for the block based on prediction mode information, a primary transform type, neighboring reconstructed samples, transform block partitioning information, a size and a shape of the block, and/or the like. One or a combination of the prediction mode information, the primary transform type, and the size of the block (or the block size) can be utilized to derive context information. The context information can be used to determine context(s) to be used for entropy coding a secondary transform index used to identify a secondary transform among a set of secondary transforms (e.g., a set of non-separable secondary transforms). The secondary transform index can be used in decoding the block.

In the disclosure, the term block may refer to a PB, a CB, a coded block, a coding unit (CU), a transform block (TB), a transform unit (TU), a luma block (e.g., a luma CB), a chroma block (e.g., a chroma CB), or the like.

The size of a block can refer to a block width, a block height, a block aspect ratio (e.g., a ratio of a block width over a block height, a ratio of a block height over a block width), a block area size or a block area (e.g., a block width×a block height), a minimum of a block width and a block height, a maximum of a block width and a block height, and/or the like.

Information indicating a secondary transform (e.g., a secondary transform kernel, a secondary transform core, or a secondary transform matrix) used for coding (e.g., encoding and/or decoding) the block can include an index (e.g., a secondary transform index). As discussed above, in an embodiment, multiple transform sets can be used, and one or more secondary transform matrices (or kernels) can be included in each of the multiple transform sets. According to aspects of the disclosure, a transform set can be selected from the multiple transform sets using any suitable method including but not limited to that described with reference to Table 1, and the secondary transform (e.g., the secondary transform matrix) used to code (e.g., encode and/or decode) the block can be determined (e.g., selected) from the one or more secondary transform matrices in the transform set by the index (e.g., the secondary transform index). The index (e.g., the secondary transform matrix) can be used to identify one secondary transform among a transform set of secondary transforms used for decoding the block. In an example, the transform set of secondary transforms includes a set of non-separable secondary transforms used for decoding the block. In an example, the index (e.g., the secondary transform matrix) is denoted as stIdx. The index (e.g., the secondary transform index) can be explicitly signaled, for example, in the coded video bitstream.

In an example, the secondary transform is an LFNST, and the secondary transform index refers to an LFNST index. In some examples, the secondary transform is not applied to the block (e.g., a CB coded with a transform skip mode or a number of non-zero coefficients of the CB is less than a threshold). In an example, the secondary transform index (e.g., the LFNST index) is not signaled for the block when the secondary transform is not to be applied to the block. A default value for the secondary transform index can be zero and not signaled, indicating that the secondary transform is not applied to the block.

According to aspects of the disclosure, coded information for a block (e.g., a TB) can be decoded from a coded video bitstream. The coded information can indicate one or more of prediction mode information for the block, a size of the block, and a primary transform type used for the block. The primary transform type can refer to any suitable primary transform, such as one or a combination of those described with references to FIGS. 15 and 16A-16D.

In an example, the block is intra coded or intra predicted, and the prediction mode information is referred to as intra prediction mode information. The prediction mode information (e.g., the intra prediction mode information) for the block can indicate an intra prediction mode used for the block. The intra prediction mode can refer to a prediction mode used for intra prediction of the block, such as a directional mode (or a directional prediction mode) described in FIG. 9, a non-directional prediction mode (e.g., the DC mode, the PAETH mode, the SMOOTH mode, the SMOOTH_V mode, or the SMOOTH_H mode) described in FIG. 10, or a recursive filtering mode described in FIG. 11. The intra prediction mode can also refer to a prediction mode described in the disclosure, a suitable variation of a prediction mode that is described in the disclosure, or a suitable combination of prediction modes described in the disclosure. For example, the intra prediction mode can be combined with multi-line intra prediction described in FIG. 12.

The coded information, such as the one or more of the prediction mode information for the block, the size of the block, and the primary transform type used for the block, can be used as a context for entropy coding (e.g., entropy encoding and/or entropy decoding) a secondary transform index (e.g., stIdx). The context for entropy coding (e.g., entropy encoding and/or entropy decoding) the secondary transform index can be determined based on the coded information, such as the one or more of the prediction mode information for the block, the size of the block, and the primary transform type used for the block. The secondary transform index (e.g., stIdx) can indicate a secondary transform in a set of secondary transforms that is to be performed on the block.

A context derivation process can be used to determine the context. The context derivation process for entropy coding (e.g., encoding and/or decoding) the secondary transform index can depend on the coded information.

The context for entropy coding (e.g., encoding and/or decoding) the secondary transform index can be determined based on the one or more of the prediction mode information (e.g., the intra prediction mode information) for the block, the size of the block, and the primary transform type used for the block. In an example, the context for entropy coding (e.g., encoding and/or decoding) the secondary transform index is determined based on one of the prediction mode information (e.g., the intra prediction mode information) for the block, the size of the block, and the primary transform type used for the block. The secondary transform index can be entropy coded (e.g., encoded and/or decoded) based on the context. The secondary transform (e.g., an inverse secondary transform) indicated by the secondary transform index can be performed on the block (e.g., the TB).

In an embodiment, the context derivation process for entropy coding (e.g., encoding and/or decoding) the secondary transform index (e.g., the stIdx) can depend on the size of the block. In an example, a largest square block size associated with the block refers to a size of a largest square block in the block. The largest square block size is less than or equal to the size of the block. In an example, the size of the block is a TB size when the block refers to a TB. The largest square block size can be used in the context derivation process. In an example, the largest square block size is used as the context. For example, the size of the block can indicate a block width W and a block height H. The largest square block size is L×L where L is a minimum of W and H. The largest square block size can also be indicated by L. If W is 32, H is 8, L is 8. The largest square block size can be indicated by 8 or 8×8.

In an embodiment, the one of the intra prediction mode information for the block, the size of the block, and the primary transform type used for the block can indicate the size of the block. The context for entropy coding (e.g., encoding and/or decoding) the secondary transform index can be determined based on the size of the block. In an example, the size of the block indicates the width W of the block and the height H of the block. A minimum of the width W of the block and the height H of the block is denoted as L. The context can be determined based on the largest square block size L or L×L. In an example, the largest square block size L or L×L is used as the context.

In an embodiment, the context derivation process for entropy coding (e.g., encoding and/or decoding) the secondary transform index (e.g., the stIdx) can depend on the prediction mode information (e.g., the intra prediction mode information) for the block. The context for entropy coding (e.g., encoding and/or decoding) the secondary transform index can be derived based on the prediction mode information (e.g., the intra prediction mode information) for the block.

In an example, the block is intra predicted using one of the directional modes (also referred to as the directional prediction modes), such as described with reference to FIG. 9. Referring to FIG. 9, a nominal mode index can indicate a nominal mode (e.g., one of the eight nominal modes). In an example, a directional mode (e.g., one of the 56 directional modes) can be determined based on the nominal mode index and an index indicating an angular offset from the nominal mode. The prediction mode information (e.g., the intra prediction mode information) for the block can indicate the nominal mode index. The nominal mode index can be used for the context derivation process. The context for entropy coding (e.g., encoding and/or decoding) the secondary transform index can be derived based on the nominal mode index.

In an embodiment, the one of the intra prediction mode information for the block, the size of the block, and the primary transform type used for the block can indicate the intra prediction mode information for the block. The context for entropy coding (e.g., encoding and/or decoding) the secondary transform index can be determined based on the intra prediction mode information for the block. In an example, the intra prediction mode information for the block indicates the nominal mode index. The block can be predicted using the directional prediction mode that is determined based on the nominal mode index and the angular offset, as described above. The context for entropy coding (e.g., encoding and/or decoding) the secondary transform index can be determined based on the nominal mode index.

In an embodiment, the block is intra predicted using the directional mode as described above. The nominal mode index can be mapped to an index value that is different from the nominal mode index, and the index value can be used in the context derivation process. In an example, multiple intra prediction modes (e.g., multiple nominal modes shown in FIG. 9) can be mapped to the same index value. The multiple nominal modes (or multiple nominal mode indices corresponding to the multiple nominal modes) can be mapped to the same index value. The multiple nominal modes can be adjacent to each other. Referring to FIG. 9, D67_PRED and D45_PRED can be mapped to a same index value.

In an embodiment, the intra prediction mode information for the block indicates the nominal mode index, the block can be predicted using the directional mode (or the directional prediction mode) that is determined based on the nominal mode index and the angular offset. The context for entropy coding (e.g., encoding and/or decoding) the secondary transform index can be determined based on the index value associated with the nominal mode index (e.g., the nominal mode index is mapped to the index value).

In an embodiment, the block is intra predicted using one of the non-directional prediction modes (also referred to as the non-directional smooth intra prediction modes) including, for example, the DC mode, the PAETH mode, the SMOOTH mode, the SMOOTH_V mode, and the SMOOTH_H mode, as described with reference to FIG. 10. A corresponding mode index (also referred to as a non-directional prediction mode index) indicating the one of the non-directional prediction modes can be used for the context derivation process. In an example, the same context can be applied to entropy code the secondary transform index (e.g., the stIdx) for one or more of the non-directional prediction modes. The same context can correspond to a plurality of the non-directional prediction modes.

In an embodiment, the intra prediction mode information for the block can indicate the non-directional prediction mode index. The block can be predicted using the one of the non-directional prediction modes (e.g., a non-directional prediction mode) indicated by the non-directional prediction mode index. The context for entropy coding (e.g., encoding and/or decoding) the secondary transform index can be determined based on the non-directional prediction mode index.

In an example, the block is intra predicted using one of the recursive filtering modes, such as described with reference to FIG. 11. A mapping can be first performed from the one of the recursive filtering mode to a nominal mode index where the nominal mode index can indicate a nominal mode (e.g., one of the eight nominal modes in FIG. 9). The nominal mode index can be subsequently used for the context derivation process. In an example, the same context can be applied to entropy code (e.g., encode and/or decode) the secondary transform index (e.g., the stIdx) for one or more of the recursive filtering modes. The same context can correspond to a plurality of the recursive filtering modes.

In an embodiment, the intra prediction mode information for the block can indicate a recursive filtering mode (one of the recursive filtering modes) used to predict the block. A nominal mode index indicating a nominal mode can be determined based on the recursive filtering mode. The context for entropy coding (e.g., encoding and/or decoding) the secondary transform index can be determined based on the nominal mode index.

In an embodiment, the context derivation process for entropy coding the secondary transform index (e.g., the stIdx) can depend on primary transform type information. The primary transform type information can indicate the primary transform type or a type of a primary transform used for the block. In an example, the context is determined based on the primary transform type. In an example, the context is determined based on the primary transform.

In an embodiment, the one of the intra prediction mode information for the block, the size of the block, and the primary transform type used for the block indicates the primary transform type used for the block. The context for entropy coding (e.g., encoding and/or decoding) the secondary transform index can be determined based on the primary transform type used for the block. The context for entropy coding the secondary transform index can be determined based on the primary transform used for the block.

In an embodiment, a primary transform for the block can include a horizontal primary transform (referred to as a horizontal transform) and a vertical primary transform (referred to as a vertical transform). The context for entropy coding (e.g., encoding and/or decoding) the secondary transform index can be determined based on the horizontal primary transform type and the vertical primary transform type. The horizontal primary transform type can indicate the horizontal transform and the vertical primary transform type can indicate the vertical transform.

The context (also referred to as a context value) can depend on whether both the horizontal primary transform type and the vertical primary transform type are DCTs or both the horizontal primary transform type and the vertical primary transform type are ADSTs.

In the disclosure, a combination of the horizontal primary transform type and the vertical primary transform type can be represented as {the horizontal primary transform type, the vertical primary transform type}. Thus, {DCT, DCT} represents both the horizontal primary transform type and the vertical primary transform type being DCTs. {ADST, ADST} represents both the horizontal primary transform type and the vertical primary transform type being ADSTs. {LGT, LGT} represents both the horizontal primary transform type and the vertical primary transform type being LGTs. {DCT, LGT} represents the horizontal primary transform type being DCT and the vertical primary transform type being LGT. {LGT, DCT} represents the horizontal primary transform type being LGT and the vertical primary transform type being DCT.

In an embodiment, the primary transform indicated by the primary transform type includes the horizontal transform indicated by the horizontal primary transform type and the vertical transform indicated by the vertical primary transform type. The context for entropy coding (e.g., encoding and/or decoding) the secondary transform index can be determined based on whether the horizontal primary transform type and the vertical primary transform type are both DCTs or both ADSTs.

In an embodiment, the context can depend on whether the combination of the horizontal and vertical primary transform types is {DCT, DCT} or {LGT, LGT}.

In an embodiment, the primary transform indicated by the primary transform type includes the horizontal transform indicated by the horizontal primary transform type and the vertical transform indicated by the vertical primary transform type. The context for entropy coding (e.g., encoding and/or decoding) the secondary transform index can be determined based on whether the horizontal primary transform type and the vertical primary transform type are both DCTs or are both LGTs.

In an embodiment, the context can depend on whether the combination of the horizontal and vertical primary transform type is {DCT, DCT}, {LGT, LGT}, {DCT, LGT}, or {LGT, DCT}.

In an embodiment, the primary transform indicated by the primary transform type includes the horizontal transform indicated by the horizontal primary transform type and the vertical transform indicated by the vertical primary transform type. The context for entropy coding (e.g., encoding and/or decoding) the secondary transform index can be determined based on whether the horizontal primary transform type and the vertical primary transform type are (i) both DCTs, (ii) both LGTs, (iii) a DCT and an LGT, respectively, or (iv) an LGT and a DCT, respectively.

In an embodiment, the context can depend on whether a combination of the horizontal and vertical primary transform type is {DCT, DCT}, {LGT, LGT}, {DCT, IDTX} or {IDTX, DCT}, wherein IDTX represents an identity transform. {DCT, IDTX} represents the horizontal primary transform type being DCT and the vertical primary transform type being IDTX. {IDTX, DCT} represents the horizontal primary transform type being IDTX and the vertical primary transform type being DCT.

In an embodiment, the primary transform indicated by the primary transform type includes the horizontal transform indicated by the horizontal primary transform type and the vertical transform indicated by the vertical primary transform type. The context for entropy coding (e.g., encoding and/or decoding) the secondary transform index can be determined based on whether the horizontal primary transform type and the vertical primary transform type are (i) both DCTs, (ii) both LGTs, (iii) a DCT and an identity transform (IDTX), respectively, or (iv) an IDTX and a DCT, respectively.

Figure 19:
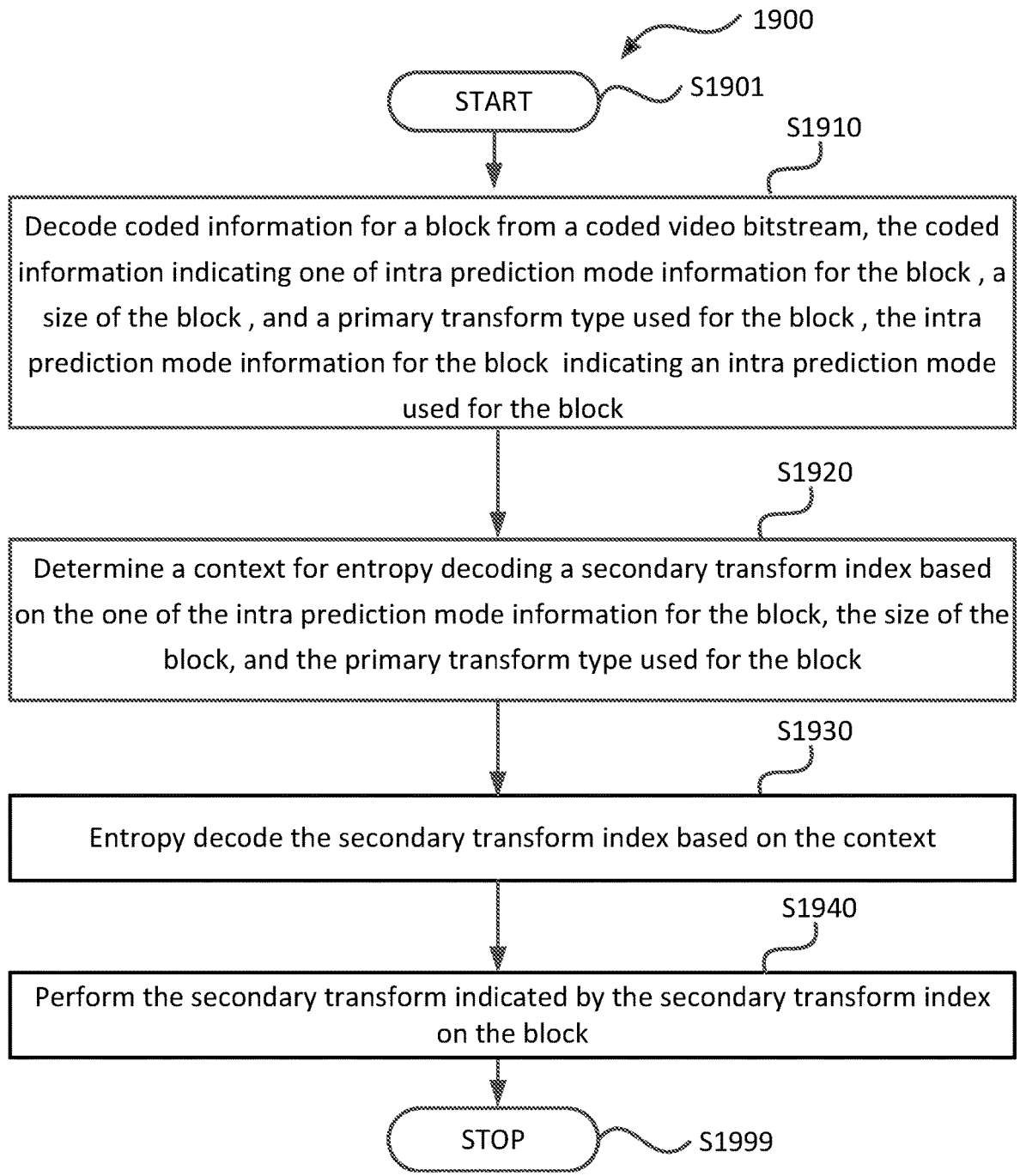
FIG. 19 shows a flow chart outlining a process (1900) according to an embodiment of the disclosure.

FIG. 19 shows a flow chart outlining a process (1900) according to an embodiment of the disclosure. The process (1900) can be used in the reconstruction of a block, such as a CB, a TB, a luma CB, a luma TB, a chroma CB, a chroma TB, or the like. In various embodiments, the process (1900) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901) and proceeds to (S1910).

At (S1910), coded information for a block (e.g., a TB, a luma TB, an intra coded TB, a CB) can be decoded from a coded video bitstream. The coded information can indicate one of intra prediction mode information for the block, a size of the block, and a primary transform type used for the block. The coded information can indicate one or more of the intra prediction mode information for the block, the size of the block, and the primary transform type used for the block.

The intra prediction mode information for the block can indicate an intra prediction mode used for intra prediction of the block, such as a directional mode, a non-directional prediction mode, or a recursive filtering mode described with references to FIGS. 9-11. The primary transform type indicates a primary transformed used for the block. Examples of the primary transform type used for the block are described in FIGS. 15 and 16A-16D.

At (S1920), a context for entropy decoding a secondary transform index can be determined based on the one of the intra prediction mode information for the block, the size of the block, and the primary transform type used for the block. The secondary transform index can indicate a secondary transform in a set of secondary transforms where the secondary transform is to be performed on the block.

In an example, the context for entropy decoding the secondary transform index can be determined based on the one or more of the intra prediction mode information for the block, the size of the block, and the primary transform type used for the block.

In an example, the one of the intra prediction mode information for the block, the size of the block, and the primary transform type used for the block indicates the size of the block, and the context for entropy decoding the secondary transform index can be determined based on the size of the block.

In an example, the one of the intra prediction mode information for the block, the size of the block, and the primary transform type used for the block indicates the intra prediction mode information for the block and the context for entropy decoding the secondary transform index can be determined based on the intra prediction mode information for the block.

In an example, the one of the intra prediction mode information for the block, the size of the block, and the primary transform type used for the block indicates the primary transform type used for the block and the context for entropy decoding the secondary transform index can be determined based on the primary transform type used for the block.

At (S1930), the secondary transform index can be entropy decoded based on the context that is determined at (S1920).

At (S1940), the secondary transform indicated by the secondary transform index can be performed on the block. For example, the secondary transform is an inverse secondary transform performed after an inverse primary transform. In an example, the secondary transform is a LFNST. In an example, the secondary transform is a non-separable secondary transform. The process (1900) proceeds to (S1999), and terminates.

The process (1900) can be suitably adapted. Step(s) in the process (1900) can be modified and/or omitted. Additional step(s) can be added. Any suitable order of implementation can be used. For example, in addition to the directional modes, the non-directional prediction modes, or the recursive filtering modes described with references to FIGS. 9-11, the process (1900) is also applicable to other intra prediction modes. In addition to the primary transform types described with references to FIGS. 15 and 16A-16D, the process (1900) is also applicable to other suitable primary transform types or suitable combinations of a horizontal primary transform type and a vertical primary transform type.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
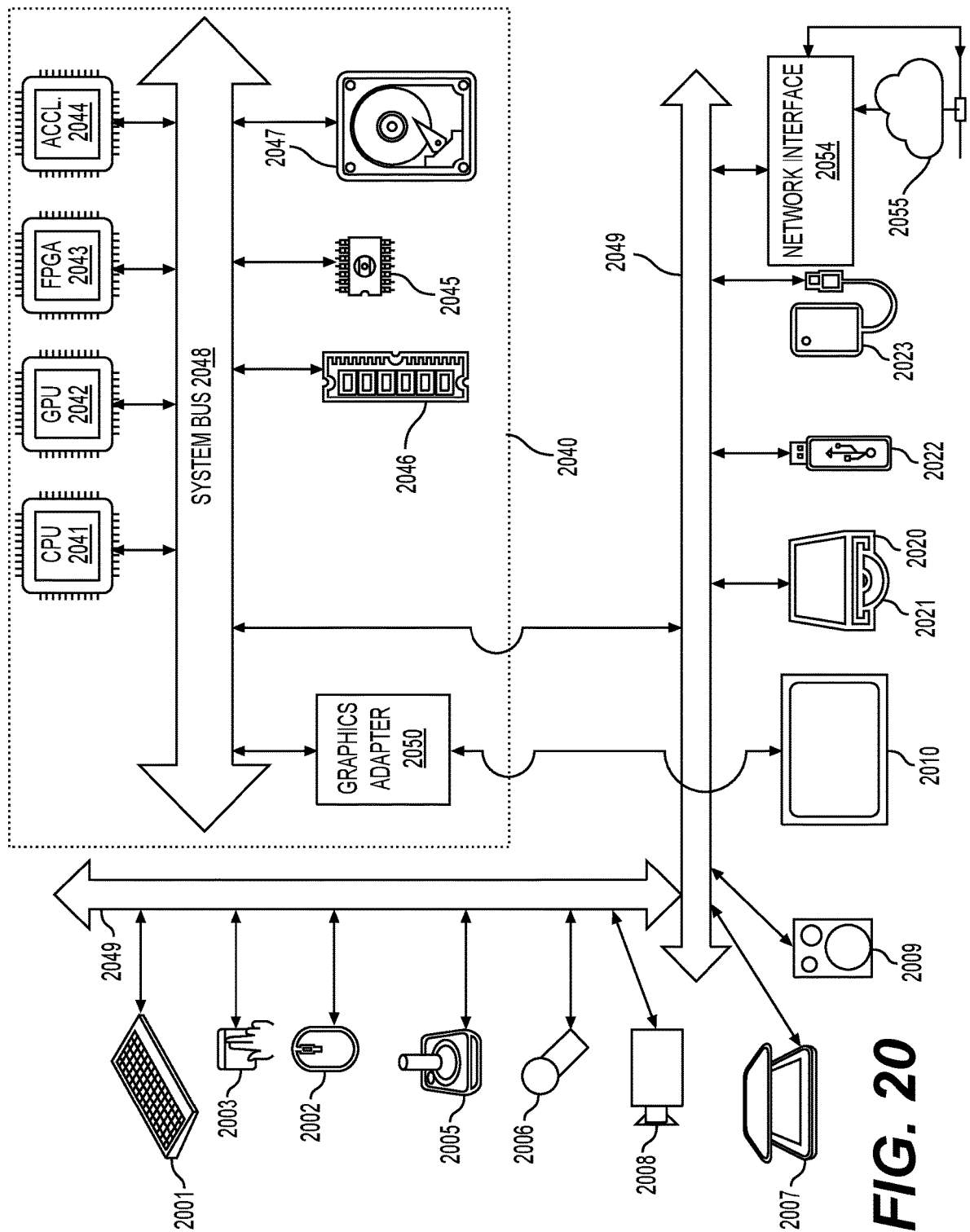
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding coded information for a transform block (TB) from a coded video bitstream, the coded information indicating a primary transform type used for the TB;
    entropy decoding a secondary transform index that is signaled in the coded video bitstream, a value of the secondary transform index being entropy decoded is dependent on the primary transform type used for the TB, the secondary transform index indicating a secondary transform in a set of secondary transforms that is to be performed on the TB; and
    performing the secondary transform indicated by the secondary transform index on the TB.

2. The method of claim 1, wherein
    the entropy decoding the secondary transform index includes entropy decoding the value of the secondary transform index based on the primary transform type used for the TB.

3. An apparatus for video decoding, comprising
    processing circuitry configured to:
    decode coded information for a transform block (TB) from a coded video bitstream, the coded information indicating a primary transform type used for the TB;
    entropy decode a secondary transform index that is signaled in the coded video bitstream, a value of the secondary transform index being entropy decoded is dependent on the primary transform type used for the TB, the secondary transform index indicating a secondary transform in a set of secondary transforms that is to be performed on the TB; and
    perform the secondary transform indicated by the secondary transform index on the TB.

4. The apparatus of claim 3, wherein
    the processing circuitry is configured to entropy decode the value of the secondary transform index based on the primary transform type used for the TB.

5. A non-transitory computer-readable storage medium storing instructions which when executed by a processor cause the processor to perform:
    decoding coded information for a transform block (TB) from a coded video bitstream, the coded information indicating a primary transform type used for the TB;
    entropy decoding a secondary transform index that is signaled in the coded video bitstream, a value of the secondary transform index being entropy decoded is dependent on the primary transform type used for the TB, the secondary transform index indicating a secondary transform in a set of secondary transforms that is to be performed on the TB; and
    performing the secondary transform indicated by the secondary transform index on the TB.

6. The non-transitory computer-readable storage medium of claim 5, wherein
    the entropy decoding the secondary transform index includes entropy decoding the value of the secondary transform index based on the primary transform type used for the TB.

* * * * *